United States Patent [19]
Perrott et al.

[11] Patent Number: 5,882,556
[45] Date of Patent: Mar. 16, 1999

[54] METHOD OF PREPARING PHOTOCHROMIC ARTICLE

[75] Inventors: Colin Maurice Perrott, Mount Barker; Kenneth John Pidgeon, O'Halloran Hill; Helena Kloubek, Morphett Vale; Ian Michael Threlfall, Happy Valley, all of Australia

[73] Assignee: Sola International Holdings Ltd., Lonsdale, Australia

[21] Appl. No.: 860,359

[22] PCT Filed: Dec. 15, 1995

[86] PCT No.: PCT/AU95/00851

§ 371 Date: Sep. 8, 1997

§ 102(e) Date: Sep. 8, 1997

[87] PCT Pub. No.: WO96/18921

PCT Pub. Date: Jun. 20, 1996

[30] Foreign Application Priority Data

Dec. 16, 1994 [AU] Australia ................... PN0071

[51] Int. Cl.⁶ ................... B29D 11/00
[52] U.S. Cl. ............... 264/1.38; 264/1.7; 264/2.1; 264/2.6; 264/496
[58] Field of Search ............... 264/1.38, 1.7, 264/1.8, 232, 236, 2.1, 2.6, 494, 496

[56] References Cited

U.S. PATENT DOCUMENTS

| | | |
|---|---|---|
| 5,130,353 | 7/1992 | Fischer et al. . |
| 5,185,390 | 2/1993 | Fischer et al. . |
| 5,405,557 | 4/1995 | Kingsbury ................... 264/1.7 |
| 5,523,030 | 6/1996 | Kingsbury ................... 264/1.7 |
| 5,531,940 | 7/1996 | Gupta et al. ................... 264/1.7 |

*Primary Examiner*—Mathieu D. Vargot
*Attorney, Agent, or Firm*—Burns, Doane, Swecker & Mathis, L.L.P.

[57] ABSTRACT

A process for preparing a cross-linked polymeric article, which process includes: providing a cross-linkable polymeric casting composition; and a photochromic composition; subjecting the cross-linkable polymeric casting composition to partial cure, such that the polymer reaches or exceeds its point of gelation; contacting the partially cured gelled polymer with the photochromic composition; and curing the gelled polymer.

23 Claims, 12 Drawing Sheets

METHOD OF PREPARING PHOTOCHROMIC ARTICLE

The present invention relates to the manufacture of plastic optical articles such as video discs, ophthalmic lenses and the like. In particular, the present invention relates to the manufacture of photochromic optical articles.

A number of attempts have been made in the prior art to incorporate photochromic compounds into a synthetic polymeric host material.

For example, U.S. Pat. No. 3,212,898 describes preparing a photosensitive composition by suspending a photochromic benzospiropyran in a preformed polyester resin. U.S. Pat. No. 3,666,352 describes dispersing a mercury thiocarbazone compound in a solidified plasticised vinyl chloride-vinyl acetate copolymer, which copolymer is laminated between two plastic or glass layers, thereby to form a photochromic sunglass lens.

Photochromic plastic lenses in which photochromic molecules are dispersed throughout the lens, are often not useful for ophthalmic purposes because the dyes are activated by bands of radiation wavelengths which are quite dissimilar from dye to dye. This radiation interacts through the full section thickness of the lens to a penetration depth defined by the ultraviolet (UV) and near visible (NV) absorption characteristics of the lens/dye system. Both the transmission and colour of portions of different thickness vary according to the form of the lens. Whilst this same effect occurs to a degree with photochromic glass lenses, it is not as noticeable.

Accordingly, conventional wisdom in the prior art indicates that organic photochromic dyes must be provided in regions or zones of constant thickness, independent of the optical geometry of the lens. Surface imbibition is the only commercial process for achieving a satisfactory product. However, surface imbibation is costly and is not freely available to the public.

Particular difficulties which have been encountered in the prior art when attempts have been made to incorporate photochromic material prior to the formation of a photochromic optical article include uneven colouration caused by the variable thickness of the lens which is required to provide the lens with the necessary optical power.

Further, for example as described in U.S. Pat. No. 5,130,353 or U.S. Pat. No. 5,185,390, the prior art describes the inclusion of photochromic dyes into the subsurface regions of a plastic lens by first positioning a polymeric or other carrier of photochromic dye physically against the surface of the lens and then using heat (in the range 100° to 150° C.) to cause the dyes to undergo sorption and to diffuse into the lens. The depleted carrier is removed from the lens after the passage of sufficient time at elevated temperature, typically of order ½ to 4 hours. It is found that adequate darkening is achieved with inclusion of 0.5 to 10 $\mu$gm/mm$^2$ of surface diffused to a depth of about 50 $\mu$m. The average dye concentration in this region of the lens is in the range of 0.01 to 0.2 mgm/mm$^3$, or 0.7 to 14% (w/w) of the polymer weight in that region. This corresponds to an Absorbance or Optical Density (OD) in the range of 0.1 to 0.5, dependent on the wavelength dependent absorption characteristics of the individual Photochrome. A typical useful practical range is 0.1 to 0.25 OD units based upon the 390 nm wavelength absorption of a Chromene. Typically 4 hours imbibition at 140° C. produces 0.2 to 0.3 OD units of absorption at 390 nm and produces lenses with an effective working photochromic performance.

For this procedure to operate effectively, the carrier must accommodate a sufficient concentration of dye in sufficient volume to deliver the required level of dopant. Commonly, carrier films are in the range 50 to 80 $\mu$m thick. The intensity and duration of the heating step should be sufficient to obtain thermal transfer by permeation of the dyes without decomposing them or causing significant softening of the host polymer (lens). Either decomposition or softening will result in lenses being rejected.

An alternative approach is to include the dyes within an optical coating resin and applying the coating to the lens directly. Optical coatings thus applied are rarely thicker than 10 $\mu$m because of declining optical quality and the magnification of stresses caused by differential shrinkage of thick coatings. Because of this thickness limitation, the optical density achieved by this approach falls well short of the target levels. Hence, it would be a significant advance in the art if the permeation process could be improved to minimise the effect that elevated temperature has upon both the dyes and the polymer.

It is accordingly an object of the present invention to overcome or at least alleviate one or more of the difficulties and deficiencies related to the prior art.

Accordingly, in a first aspect of the present invention there is provided A process for preparing a cross-linked polymeric article, which process includes providing
  a cross-linkable polymeric casting composition; and
  a photochromic composition including a photochromic dye or pigment;

subjecting the cross-linkable casting composition to partial cure, such that the polymer reaches or exceeds its point of gelation; and contacting the partially cured gelled polymer with the photochromic composition, for a period sufficient for transfer of dye or pigment from the photochromic composition to the gelled polymer by permeation.

Applicants have established that by contacting the partially cured polymer with the photochromic composition at or above the gelation point of the polymer, highly efficient and effective photochromic polymer articles may be achieved.

Whilst we do not wish to be restricted by theory, it is postulated that the process of sorption and permeation of dyes is often diffusion controlled, that is driven by the gradient in concentration of the permeant from the source (carrier) into the polymer. Temperature assists this process by increasing the solubility of the permeant and its diffusion coefficient. There are two attributes of the polymer which directly affect permeation. Chain ends in the polymer represent discontinuities or sites of free volume which may accommodate permeant molecules. These decrease in number as the polymer molecular weight increases and/or the degree of cross-linking increases. Further, the ability of the structure to accommodate the permeant and allow it to move from site to site diminishes as the structure becomes more rigid. A substantial increase in diffusion coefficient occurs when the temperature of the host exceeds the glass transition temperature Tg (see Tim de V. Naylor in "Comprehensive Polymer Science", G. Allen et al/Eds), Pergamon Press, Oxford (1989) Vol 2 pp. 643–668).

Applicants have realised, therefore, that the most efficient permeation is achieved, not so much by elevating the temperature of the polymer whilst diffusing the dye, but ensuring that the polymer Tg and cross-linking density are as low as possible whilst the permeation is taking place.

The cross-linkable polymeric casting composition may be an ultraviolet (UV) cross-linkable polymeric casting composition or a thermally initiated cross-linkable polymeric casting composition.

The cross-linkable polymeric casting composition utilised in the process of the present invention may include
a monomer or monomers including a polymerisable double bond.

The polymerisable monomer may be selected from any suitable type, e.g. methacrylates, acrylates, vinyls, vinyl ethers, allyls, aromatic olefins, ethers, polythiols, epoxies and the like and mixtures thereof. A diethylene glycol bis(allyl carbonate) such as CR39 (PPG) may be used.

A diacrylate or dimethacrylate monomer is preferred. The diacrylate or dimethacrylate monomer may be a polyoxyalkylene glycol diacrylate or dimethacrylate, for example a polyethylene glycol dimethacrylate with an average molecular weight of approximately 600.

The casting composition may include a polymerisable comonomer. The polymerisable comonomer(s) may be selected to improve the properties and/or processability of the cross-linkable polymeric casting composition. The polymerisable comonomer may be a low viscosity comonomer. The low viscosity comonomer may be of any suitable type. The low viscosity comonomer may be selected from one or more of aromatic olefins, polymerisable bisphenol monomers capable of forming a homopolymer having a high refractive index of more than 1.55, urethane monomers having 2 to 6 terminal acrylic or methacrylic groups, and thiodiacrylate or dimethacrylate monomers.

The aromatic olefins may be selected from styrene, divinyl benzene and 3,9-divinyl-2,4,8,10-tetraoxaspiro [5.5] undecane (DTU). The aromatic olefins may be present in amounts of approximately 5 to 50% by weight.

The thiodiacrylate or dimethacrylates may be selected from bis(4-methacryloylthioethyl)sulfide (BMTES) and bis (4-methacryloylthiophenyl)sulfide (BMTS or TS). The thiodiacrylate may be present in amounts of from approximately 5 to 40% by weight, preferably 20 to 40% by weight.

The polyoxy alkylene glycol diacrylate or dimethacrylate compound according to the present invention may include ethylene oxide or propylene oxide repeating units in its backbone. A polyethylene glycol dimethacrylate is preferred. One suitable material is that sold under the trade name NKESTER 9G by Shin Nakamura. Alternatively, an NK Ester 6G, 4G or 14G may be used.

The polyoxy alkylene glycol diacrylate or dimethacrylate component may be present in amounts of from approximately 5% by weight to 60% by weight based on the total weight of the casting composition.

The high index bisphenol monomer component in the cross-linkable casting composition may be selected from: dimethacrylate and diacrylate esters of bisphenol A; dimethacrylate and diacrylate esters of 4,4'bishydroxyethoxy-bisphenol A and the like.

The high index bisphenol monomer may be present in amounts of from approximately 10 to 60% by weight, preferably 20 to 55% by weight, based on the total weight of the casting composition.

The cross-linkable polymeric casting composition may include a urethane monomer having 2 to 6 terminal acrylic and/or methacrylic groups. Suitable materials falling within this definition include materials supplied under the trade names U-4H, U-4HA and U-6HA by Shin Nakamura, NF-201 and NF-202 by Mitsubishi Rayon.

The urethane monomer may be present in amounts of from approximately 2.5% to approximately 35% by weight, preferably 5% to 25% by weight, based on the total weight of the casting composition.

In a preferred aspect of the present invention the cross-linkable polymeric coating composition may further include at least one poly-functional unsaturated cross-linking agent.

The poly functional unsaturated cross-linking agent according to the present invention may be a tri- or tetra-functional vinyl, an acrylic or methacrylic monomer. The cross-linking agent may be a short chain monomer for example trimethylol propane trimethacrylate, pentaerythritol triacrylate or tetracrylate, or the like. Other polyfunctional cross-linking agents which may be used include NK Ester TMPT, NK Ester A-TMPT, NK Ester A-TMM-3, NK Ester A-TMMT, di-trimethylol propane tetraacrylate, trimethylolpropane triacrylate, pentaerythritrol tetramethacrylate, dipentaerythritol monohydroxypenta acrylate, pentaerythritol triacrylate, ethoxylated trimethylolpropane triacrylate, ethoxylated trimethylolpropane trimethacrylate.

The polyfunctional unsaturated cross-linking agent may be present in amounts of from approximately 5 to 45% by weight, preferably approximately 30 to 40% by weight based on the total weight of the casting composition.

The cross-linkable casting composition may further include a co-reactant including a polythiol.

The polythiol may be selected from the group consisting of Pentaerythritol Tetrakis (3-mercapto-propionate) [PTMP], Trimethylolpropane Tris (3-mercaptopropionate) [TTMP], 4-mercaptomethyl-3,6-dithia-1,8-octanedithiol [MDO], Pentaerythritol Tetrakis (3-mercaptoacetate) [PTMA], Trimethylolpropane Tris (3-mercaptoacetate) [TTMA], 4-t-butyl-1,2-benzenedithiol, 2-mercaptoethylsulfide, 4,4'-thiodibenzenethiol, benzenedithiol, Glycol Dimercaptoacetate, Glycol Dimercaptopropionate Ethylene bis(3-Mercaptopropionate), Polyethylene Glycol Dimercaptoacetates, Polyethylene Glycol Di(3-Mercaptopropionates).

The thiol compound may be present in amounts from 0 to approximately 50% by weight.

Such polymeric casting compositions are illustrated in U.S. Pat. No. 4,912,155 and U.S. patent application Ser. No. 07/781,392, Australian Patent 665,124 and Application 50582/93, and European Patent Specification 451349A2, the entire disclosures of which are incorporated by reference.

The commercial Spectralite (Sola) polymeric casting composition is preferred. Spectralite is a combination of a polyoxyalkylene glycol diacrylate or dimethacrylate monomer; a monomer including a recurring unit derived from at least one radical-polymerisable bisphenol monomer capable of forming a homopolymer having a high refractive index of more than 1.55; and a urethane monomer having 2 to 6 terminal groups selected from a group comprising acrylic and methacrylic groups.

The cross-linkable casting composition according to the present invention may further include an initiator. The initiator may be a heat and/or ultraviolet (UV) initiator. A cationic initiator may be used where epoxies are incorporated in the composition.

The compositions are preferably cured by a combination of UV radiation and heat.

The composition, with the addition of approximately 0.2 to 2.0% by weight of cross-linking initiator may be exposed to UV radiation for between 0.5 and 10 seconds.

Any commercially viable UV curing system may be used. We have used a Fusion System with microwave driven lamps. A number of fusion bulbs with different output Spectra may be considered. Presently we prefer the "D" bulb and the "V" bulb.

One source we have found satisfactory is a 10 inch, 300 watt/inch mercury lamp. The mould assembly is then heated to 100° C. for one hour or the lens may be removed from the assembly and heated in air for about one hour at 100° C. This means that fully cured lenses can be manufactured, if desired, in about one hour. Heat curing can also be used without any use of UV radiation.

Typically treatment with the gelled polymer may be undertaken after 1 to 2 passes under the UV lamp.

Typically 2 to 4 passes under the UV lamps plus an hour of heat treatment at 100° C. completes the cure.

Any suitable UV initiator may be used. An initiator available under the trade designation Irgacure 184 has been found to be satisfactory. More than one curing agent may be present. It has been possible to operate with a relatively low level of initiator of between approximately 0.05 and 0.25% by weight.

A range of photoinitiators available commercially can be used, depending on sample thickness, type of UV lamp used and the absorption wavelength of the monomer mix.

The following photoinitiators have been found to be suitable.

Alcolac Vicure 10—isobutyl benzoin ether

Alcolac Vicure 30—isopropyl benzoin ether

Alcolac Vicure 55 (V55)—(radical photoinitiator) methyl phenyl glyoxylate benzoic acid Cyracure UV1-6974 (cationic photoinitiator) Triaryl sulfonium hexafluoroantimonate Lucirin TPO (radical photoinitiator) 2,4,6-Trimethyl-benzoyldiphenylphosphine oxide The initiator may be a single component or combination of several initiator components.

Additionally, combination of photoiniator mixtures or photoinitiator mixtures with a heat induced free radical initiator such as peroxides, peroxypercabonates or an azo compound may also be employed.

Other additives may be present which are conventionally used in casting compositions such as inhibitors, dyes, UV stabilisers and materials capable of modifying refractive index. Mould release agents can be added but they are in general not required with the compositions used in the method of the present invention. Such additives may include:

UV Absorbers including

Ciba Geigy Tinuvin P—2(2'-hydroxy-5'methyl phenyl) benzotriazole

Cyanamid Cyasorb UV 531—2-hydroxy4-n-octoxybenzo-phenone

Cyanamid Cyasorb UV5411—2(2-hydroxy-5-t-octylphenyl)-benzotriazole

Cyanamid UV 2098—2 hydroxy-4-(2-acryloyloxyethoxy) benzophenone

National Starch and Chemicals Permasorb MA—2 hydroxy-4-(2 hydroxy-3-methacryloxy)propoxy benzophenone Cyanamid UV24—2,2'-dihydroxy4-methoxybenzophenone BASF UVINUL 400—2,4 dihydroxy-benzophenone BASF UVINUL D49—2,2'-dihydroxy4,4' dimethoxybenzophenone BASF UVINUL D-50—2,2', 4,4' tetrahydroxy benzophenone BASF UVINUL D-35-ethyl-2-cyano-3,3-diphenyl acrylate BASF UVINUL N-539-2-ethexyl-2-cyano-3,3-diphenyl acrylate Ciba Geigy Tinuvin 213

Hindered amine light stabilisers (HALS), including

Ciba Geigy Tinuvin 765/292—bis (1,2,2,6,6-pentamethyl-4-piperidyl)sebacate

Ciba Geigy 770—bis (2,2,6,6-tetramethyl-4-piperidinyl) sebacate

Antioxidants including

Ciba Geigy Irganox 245—triethylene glycol-bis-3-(3-tertbutyl-4-hydroxy-5-methyl phenyl)propionate Irganox 1010—2,2-bis[[3-[3,4-bis(1,1-dimethyl-ethyl)-4-hydroxyphenyl]- 1-oxopropoxy]methyl]-1,3-propanediyl 3,5-bis(1,1-dimethyl ethyl)-4-hydroxy benzene propanoate Irganox 1076—octadecyl 3-(3',5'-di-tert-butyl(-4'-hydroxyphenyl) propionate Anticolouring agents including Triphenyl phosphine 10 dihydro-9-oxa-10-phosphaphenanthrene-1-oxide Cure modifiers including Dodecyl mercaptan PTMP—pentarythritol tetrakis (3-mercapto propionate)

Butyl mercaptan

Bis-GMA

Thiophenol

Nofmer from Nippon Oils and Fats

Q1301 from Waco

Other monomeric additives can be present in amounts up to 10% by weight as diluents, and include monomers such as methacrylic acid, vinyl silanes, methyl allyl, hydroxy ethyl, methacrylate and materials containing hydroxy, amino and phosphine oxide groups. Other monomeric additives may be included to improve processing and/or material properties, these include:

methacrylic acid, maleic anhydride, acrylic acid adhesion promoters/modifiers such as Sartomer 9008, Sartomer 9013, Sartomer 9015 etc.

dye-enhancing, pH-adjusting monomers like Alcolac SIPOMER 2MIM a charge-reducing cationic monomer to render the material more antistatic, example Sipomer Q5-80 or Q9-75 hydrophobic comonomers: Shin Nakamura NPG, P9-G etc. to reduce the water adsorption of the material viscosity modifiers In a preferred aspect the partial curing step includes enclosing the cross-linkable polymeric casting composition between a pair of moulds, preferably glass moulds; and subjecting the cross-linkable polymeric casting composition to a first partial cure utilising a ultraviolet (UV), cationic or or thermal initiator, or mixtures thereof.

In order to ensure that a partial cure only is achieved, the partial curing step may include in a further preferred aspect subjecting the partially cured article to a quenching step.

The quenching step may take any suitable form. The partially cured article may be cooled, e.g. by contacting it with water, preferably ice water.

Subsequent completion of the cure is achieved by one or more thermal cycles and/or a second exposure to UV, as required. It is a feature of such UV curable polymers that the cure is not inhibited by oxygen. Thus, a gelled article may be removed from the mould and cured satisfactorily in air. This is not common practice in casting ophthalmic lenses, since conventional thermally cured polymers such as polymerised diethylene glycol bis(allyl carbonate) (CR39) are very sensitive to the intrusion of oxygen during the cure. However, at higher than normal initial initiator concentrations, or when the mould is closed again in the presence of surface amounts of monomer between the mould and the original lens, some additional degree of cure can be achieved with allyl systems even when the lens to be cured has been removed from the moulds and is exposed to the atmosphere. In conducting the experiment with UV curable systems, we noted that the lenses obtained by separation from the mould were very flexible, having glass transition temperatures at around room temperature.

A described above, once the initial cure is complete, the gelled polymer may be exposed to the photochromic composition. The photochromic composition may be of any suitable type. The photochromic composition may include at least one photochromic dye.

The pigment(s) or dye(s) including photochromic dye(s) may be selected from one or more of the group consisting of anthraquinones, phthalocyanines, spiro-oxazines, chromenes, pyrans including spiro-pyrans and fulgides.

Examples of preferred photochromic dyes may be selected from the group consisting of 1,3-dihydrospiro[2H-anthra[2,3-d]imidazole-2,1'-cyclohexane]-5,10-dione 1,3-dihydrospiro[2H-anthra[2,3-d]imidazole-2,1'-cyclohexane]-6,11-dione 1,3-dihydro-4-(phenylthio)spiro[2H-anthra'1,2-diimidazole-2,1'-cyclohexane]-6,11-dione 1,3-dihydrospiro[2-H-anthra[1,2-d]imidazole-2,1'-cycloheptane]-6,11-dione 1,3,3-trimethylspiro'indole-2,3'-[3H]naphtho[2,1-b]-1,4-oxazine]

2-methyl-3,3'-spiro-bi-[3H-naphtho[2,1-b]pyran] (2-Me)

2-phenyl-3-methyl-7-methoxy-8'-nitrospiro[4H-1-benzopyran-4,3'-[3H]-naphtho][2,1-b]pyran Spiro[2H-1-benzopyran-2,9'-xanthene]

8-methoxy-1',3'-dimethylspiro(2H-1-benzopyran-2,2'-(1'H)-quinoline 2,2'-Spiro-bi-[2H-1-benzopyran]

5'-amino-1',3',3'-trimethylspiro[2H-1-benzopyran-2,2'-indoline

Ethyl-β-methyl-β-(3',3'-dimethyl-6-nitrospiro(2H-1-benzopyran-2,2'-indolin-1'-yl)-propenoate (1,3-propanediyl)bis[3',3'-dimethyl-6-nitrospiro[2H-1-benzopyran-2,2'-indoline]

3,3'-dimethyl-6-nitrospiro[2H-1-benzopyrao-2,2'-benzoxazoline]

6'-methylthio-3,3'-dimethyl-8-methoxy-6-nitrospiro[2H-1-benzopyran-2,2'-benzothiozoline]

(1,2-ethanediyl)bis[8-methoxy-3-methyl-6-nitrospiro[2H-1-benzopyran-2,2'-benzothiozoline]

N-N'-bis(3,3'-dimethyl-6-nitrospiro[2H-1-benzopyran-2,2'(3'H)-benzothioazol-6'-yl)decanediamide-α-(2,5-dimethyl-3-furyl)ethylidene(Z)-ethylidenesuccinic anhydride; α-(2,5-dimethyl-3-furyl)-α',δ-dimethylfulgide 2,5-diphenyl-4-(2'-chlorophenyl)imidazole

[(2',4'-dinitrophenyl)methyl]-1H-benzimidazole

N-N-diethyl-2-phenyl-2H-phenanthro[9,10-d]imidazol-2-amine

2-Nitro-3-aminofluoren 2-amino-4-(2'-furanyl)-6H-1,3-thiazine-6-thione

In a preferred aspect the photochromic composition may include solely a dye heated to a suitable temperature. It is common in the prior art to apply tints to lenses by immersing cured plastic lenses in a bath of dyes heated to the boiling point of water. The dye stuff permeates the first few microns of the surface, giving the lens a fixed colour. Since, however, the dyes are located very close to the surface of the polymer, they are very readily bleached by exposure to UV in natural sunlight or to various cleaning solutions and solvents.

The selection of photochromic dye or pigments which may be used may extend to conventional tinting dyes. Large molecules not normally transferred into lens surfaces by imbibing from a bath into fully cured lenses are now amenable to this treatment. Some pigments and UV absorbers such as carbon black or Monarch 71 (providing a deep grey lens blocking UV and IR radiation) and quinacridone magenta, phthalocyanine green, cadmium yellow and other materials which absorb uniformly across the UVA range of wavelengths can be incorporated effectively by choosing the polymer Tg near or below the tinting bath temperature.

Alternatively UV stabilising materials may be added to the outermost surface regions by imbibing into an already tinted lens via a bath of elevated temperatures. In this last configuration, the UV stabilisers tend to remain concentrated near the surface when other dyes have diffused towards the bulk in the thermal pre-treatment of the lens cure cycle.

In a further preferred aspect, the photochromic composition may include a photochromic dye dissolved or dispersed in a suitable solvent.

In the solvent imbibing of photochromic dyes utilising prior art techniques, applicants have found that very strict conditions apply for achieving even the least success with incorporating dyes into the surface of fully cured lenses. Modest, if any, improvement follows the selection of softened lenses (i.e. not fully cured) which can be sold without further curing. The rate of dye uptake is negligible unless the solvent bath temperature is in the range 150° to 200° C., leading to high levels of dye loss and physical destruction of the lenses due to distortion or splitting.

In this aspect, photochromic dyes dispersed in silicone oils or fluorinated organic solvents have been found to be suitable. For example appropriate levels of photochromic dye may be incorporated into the lens surface from a bath operating at approximately 100° C. or less, for example 75° C., in reasonable time, e.g. several minutes. A particularly suitable solvent is the product PP9 from ISC Chemicals. All of the economics noted above for tinting with conventional dyes apply in this embodiment, with the specific cost advantage given by a low rate of loss of expensive photochromic dyes and the ability to achieve bath saturation with a limited mass of dye stuff. As before, the dye diffuses towards the bulk of the lens during the heat treatment cycle.

To gain longest fatigue life, it is beneficial to treat the lens after completion of cure with an impervious hard coating. This may contain near visible (NV) and/or ultraviolet (UV) absorbers as desired.

In a still further aspect of the present invention there is provided a photochromic coating composition includes
 a photochromic dye;
 a film forming polymer; and
 a solvent therefor.

Illustrative photochromic dyes are described above. See also U.S. Pat. No. 4,851,530, the entire disclosure of which is incorporated herein by reference.

The polymeric film-forming polymer may be selected from one or more of the group consisting of polyvinyl chloride, polyvinylacetate, polyurethanes, polyvinylbutyral, copolymers of vinyl chloride and vinyl acetate, copolymers of vinyl chloride and vinylidene chloride, polyvinyl propionate, cellulose acetate butyrate, polymerizates of the lower alkyl ($C_1$ to $c_4$), e.g., methyl, ethyl, n-butyl and isobutyl, esters or acrylic and methacrylic acid such as polymethylacrylate, polymethylmethacrylate and polymethyl/butyl methacrylate and mixtures thereof. In a particularly preferred aspect, the film-forming polymer may be similar to, or identical with, the cross-linkable polymeric casting composition described above.

The photochromic coating composition may be applied to the surface of the gelled article by means resulting in a substantially dry coating so as to obtain a substantially mottle-free coating.

Examples of readily volatile or vaporisable solvents include toluene, benzene, xylene, methylethylketone, methylisobutylketone, methylchloroform acetonitrile, tetrahydrofuran, dioxane, cyclohexanone, ethyl acetate, propyl acetate, isopropyl acetate, isobutyl acetate, butyl acetate, methyl alcohol, ethyl alcohol, butanol, isopropanol, 2-methoxyethanol, acetone, and mixtures of such solvents. Preferably, the solvent is selected from toluene, methylethylketone, methylisobutylketone and mixtures of such solvents.

The photochromic coating composition comprising polymer, photochromic dye or pigment and solvent can be prepared by any convenient technique, e.g. by dissolving independently the resin and photochromic substance in appropriate solvents.

In an alternative aspect of the present invention the photochromic coating composition includes a photochromic dye; and a polymerisable carrier composition.

The polymerisable carrier composition may be the same as, or similar to, the cross-linkable polymeric casting composition used to form the polymeric lens.

The above-described photochromic coating composition may be applied to at least one principal surface of the gelled article by techniques known in the art that are suitable to produce a substantially mottle-free coating or film of substantially uniform thickness.

Application techniques that may be employed include spraying, brushing, spin-coating, dip coating and use of a draw-down blade or wire bar. Of the aforesaid techniques, dip coating, e.g. in a tinting bath, is preferred.

By taking UV curable polymers to an early stage of cure (as described above), and removing the moulds whilst the Tg is relatively close to room temperature, e.g. 30° C., we are able to achieve rapid uptake of the dye stuff from a bath operated close to room temperature, in the range of approximately 35° to 90° C., preferably 75° to 90° C. The temperature used is dependent both on the nature of the lens polymer and its Tg and on the nature of the imbibition carrier. Water is less preferred than Silicone Oil. This so-called "cold tinting" process is controlled more readily if the solvent is held slightly above ambient temperatures. The rate of dye uptake is controlled by the selected values of both temperature and polymer glass transition temperature Tg. It is desirable for most dyes, such as those in the anthraquinone and like classes which enter the polymer surface readily, to establish the Tg slightly higher (10° to 20° C.) above the chosen bath temperature. This limits the sensitivity of dye uptake to the time of immersion.

"Cold tinting" offers several practical advantages to a lens manufacturer. The temperature of the vat being close to ambient, the risk of skin burns and other injury to process workers is minimised. The rate of solvent evaporation is also minimised, promoting control of the bath concentration and limiting fume or vapour generation in the factory. With water based systems operating at, or close to the boiling point, applicants experience intolerable levels of steam in production facilities. Operator discomfort and corrosion of physical plant are serious issues. A further benefit of "cold tinting" is that the lenses can be preheated slightly so that they enter the bath in thermal equilibrium with the bath, thus avoiding departures from thermal balance caused by batch loading of the conventional high temperature process.

Significant economic gains come from the reduction in heating costs and from the reduced solubility of the dyes in solvent held at lower temperatures. The quantity of dye required to saturate a bath of liquid near ambient temperature is very much less than is required for the same system at 100° C. or above. Added to these factors, we observe a dramatic reduction in the rate of thermal or impurity degradation of the dyes.

After removal from the tinting bath, each article, e.g. lens may be rinsed clean, dried and then cured. The next step in the cure cycle is to activate free radicals in the polymer, e.g. by heating the lens to a temperature in the range 90° C. to 100° C. for about half an hour. If, for tinted lenses, the temperature is first raised to 75° C. or so, we have the opportunity to hold the polymer above the Tg for a desired period with relatively minimal increase in cure. At this stage, the imbibed dye which is concentrated at the lens surface has the opportunity to permeate within the polymer according to the thermodynamic driving force, namely to equilibrate dye concentration through the polymer.

This has two product advantages. First, to give a uniform dye concentration across the lens surface. Second, to cause the dye to infiltrate the deeper regions of polymer and be protected from UV and solvent degradation. The light fastness, i.e. resistance to exposure to sunlight, approaches that of lenses incorporating the dyes within the monomer from which the lens is cast. Red and yellow dyes in particular are found to have lifetime extended by as much as two times. This is a particular advantage in attempting to approach the durability of glass lenses, a factor of great importance for prescription sun lenses.

In a further embodiment the present invention provides an improved method for including photochromic molecules within a lens, without removal from the moulds until the curing process is essentially complete. This process, to be described below, is equally applicable to thermally cured resins, UV cured resins and those using mixed curing methodologies.

Accordingly, a process for preparing an ophthalmic lens which process includes providing
    a photochromic coating composition including a photochromic dye or pigment;
    a cross-linkable polymeric casting composition; and
    a suitable mould;

coating a portion of the mould with the photochromic coating composition;

adding the cross-linkable polymeric casting composition to the coated mould so that the casting composition is in contact with the photochromic coating composition; and subjecting the cross-linkable polymeric casting composition to a partial cure such that the polymer reaches or exceeds its point of gelation and maintaining contact between the partially cured gelled polymer and the photochromic coating composition for a period sufficient for dye or pigment transfer from the coating composition to the gelled polymer by permeation.

Preferably the photochromic coating composition may be applied to one or both mould surfaces prior to casting a lens between those surfaces. Preferably, this layer material will be close to saturated with the dyes when applied to the moulds. However, super-saturation is acceptable provided the separate dye or pigment crystallites are dispersed uniformly as a suspension in the liquid resin.

The layer of the photochromic coating composition is preferably applied at uniform thickness, e.g. by spin coating the mould surface. The layer may be converted to a cure at, or slightly beyond, the gel point by UV curing or by peroxy initiator activated at high temperatures. Examples of such initiators include Lupersbl 231 or TX29 which allow gelation of the layer by elevation to approximately 100° to 120° C. under IR heating. Both processes capture a layer of dye or pigment laden material on the mould surface with gelation periods measured in seconds or, at most, a few minutes.

It is quite practical, therefore, to build up layer thickness in the range 2 to 50 $\mu$m by sequential application to the mould. This layered structure will not be stressed and surface irregularities will not be at the final optical surface, but at an interface between the mould coating and the body of the lens to be cast within the cavity defined by the moulds. If the two are matched for index of refraction, no optical boundary is detectable.

If the lens material cast within the mould cavity thus established is an identical polymer to that already deposited on the moulds, there is no micro structural barrier in the final product as would resemble the familiar process of in-mould coating. Following the same principles as outlined above, a first stage cure profile is utilised which brings the body of the article, e.g. a lens, to the gel point, or slightly beyond, so its Tg is again near ambient temperature.

This procedure may involve further cross-linking of the dye-laden surface, which may constitute a detrimental effect in the manufacturing process. By use of slightly different initiators with appropriate gelation procedures, the Tg of lens surface and lens body can be kept within a narrow margin, say 20° C. Therefore, a region near the mould surface may be produced wherein the polymer is laden with sufficient dye (fixed tint, pigment, or photochromic) to render the necessary optical density to the final lens and the Tg of the bulk polymer is much lower than the decomposition temperature of the dyes, or of any polymer components.

Therefore, applicants have found it possible to include dyes and pigments at the surface of a polymeric structure and to diffuse those permeants into the bulk of the lens by permeation at a temperature between the initial Tg of the lens and the temperature at which the second stage of polymer conversion commences. Because the lens is not removed from the mould until the cure is complete, monomers sensitive to oxygen inhibition can be processed. We have found that a range of conventional and high index thermo setting resins respond well to this process. The key is in selecting an initiator and thermal cycle which inflicts the least damage on the dyes themselves.

A further advantage of this procedure is that the optical surfaces of the lens and, hence, the volumetric shape are both controlled by the adhesion of the polymer to the moulds through until completion of the cure. For this reason, we achieve best optical quality of the final product. The initial layer bearing the dyes is somewhat analogous to the carrier films cited in other patents. However, the prior art requires this layer to be removed after permeation is complete. We find it entirely acceptable to retain that layer as an integral part of the lens structure.

The present invention will now be more fully described with reference to the accompanying figures and examples. It should be understood, however, that the description following is illustrative only and should not be taken in any way as a restriction on the generality of the invention described above.

IN THE FIGURES

EXAMPLE 1

Figure 1:
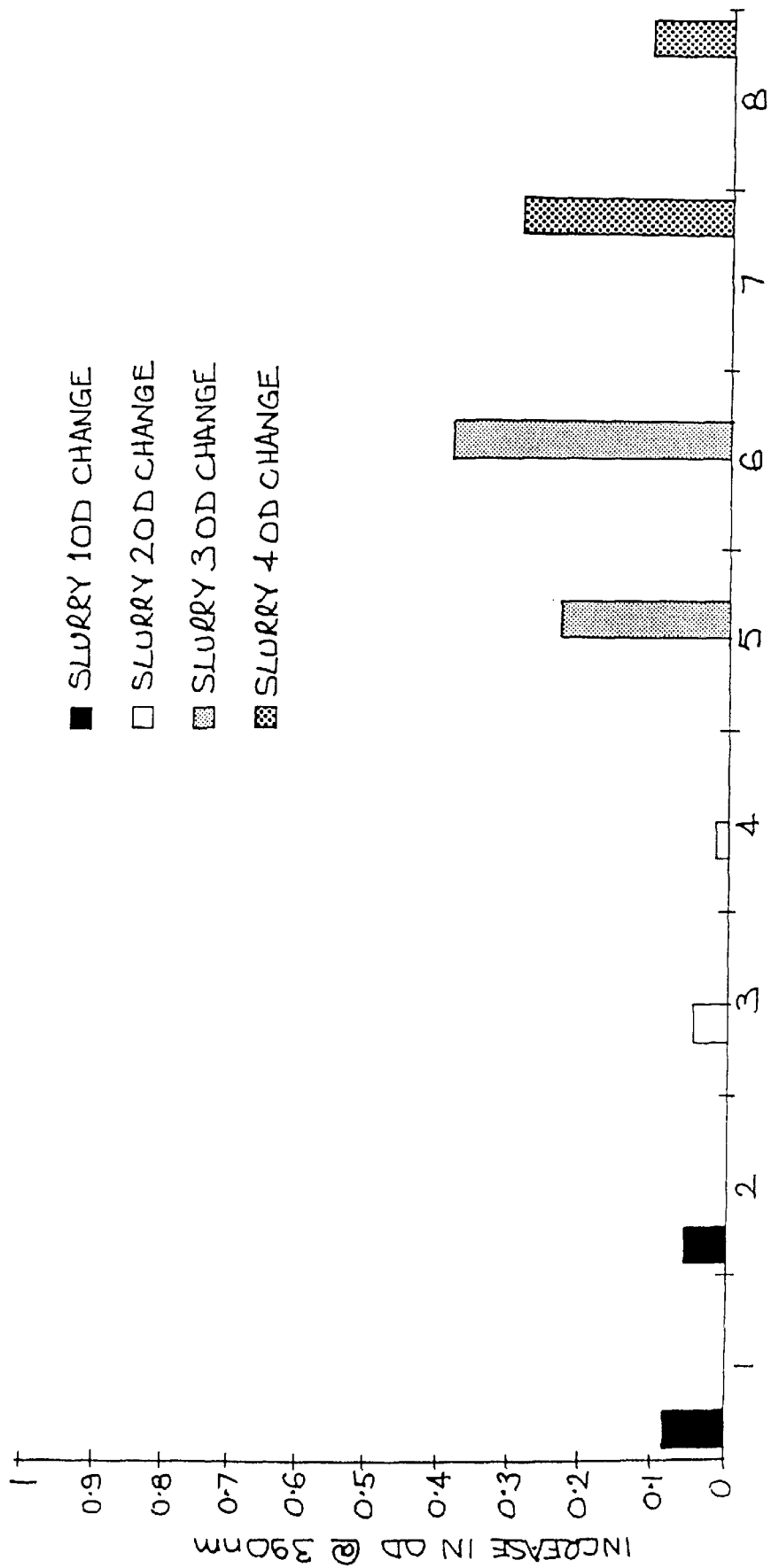
FIG. 1 is a plot of increase in optical density (OD) @ 390 nm upon imbibition for 4 hours @ 90° C. for CR39-type partially cured lenses using Imbibition Slurries 1–4 described below.

Preparation of Partially Cured Lenses
Method for CR39-Type Lenses

Diethylene glycol bis(allyl carbonate) (CR39) monomer was mixed with an aliphatic peroxy-type initiator and filled into lens moulds. The monomer was then subjected to cure in the presence of an allyl curing agent for approximately 8 hours, that is until between approximately 30 and 50% conversion had been achieved. Once the imbibation step described below has been completed, the final lenses are generated using standard thermal cure.

Method for Spectralite-Type Lenses

A blend of polyoxyalkylene glycol diacrylate or dimethacrylate monomer; a monomer including a recurring unit derived from at least one radical-polymerisable bisphenol monomer capable of forming a homopolymer having a high refractive index of more than 1.55; and a urethane monomer having 2 to 6 terminal groups selected from a group comprising acrylic and methacrylic groups were mixed together in the presence of a hindered amine light stabiliser (HALS) to form a Spectralite-type blend of monomers substantially as described in Australian Patent 641750 to applicants, the entire disclosure of which is incorporated herein by reference.

Approximately 0.4 percent by weight by a UV initiator (e.g. Vicure) is mixed with the Spectralite monomer blend and placed in suitable mould assemblies and subjected to UV cure until approximately 30 to 50% conversion as been achieved.

Once the imbibation steps described below have been completed final curing of the lenses may be by further UV cure optionally with a short thermal teatment, e.g. approximately 20 minutes at approximately 100° C.

Method for UV+Thermal Spectralite

The method for preparation of UV Spectralite described above may be repeated in the presence of a combination of a UV+Thermal initiator in amounts of approximately 0.2% and 0.5% respectively. The Spectralite monomer blend is then subjected to UV cure until between approximately 30 and 50% conversion has been achieved.

Once the imbibation steps described below have been completed the partially cured lenses are subjected to a thermal cure, e.g. for approximately 4 hours at 110° C.

Imbibition Slurry Preparation

Each slurry contains approximately 0.4 grams of photochrome in 10 grams of carrier with, e.g. one gram used per imbibition. The general carriers were water and silicone oil. The silicone oil is a Dow Corning 6505 (200 Fluid/100 cs).

The following slurries were used:

Slurry 1 is Reversacol Corn Yellow (a Chromene) from James Robinson Ltd. (Huddersfield, United Kingdom) in water Slurry 2 is Fulgide FG-2 (a Fulgide) from Tokuyama Soda in Water Slurry 3 is BuPW8 from Pilkington UK (a Spiro-oxazine) in Water Slurry 4 is Reversacol Corn Yellow (a Chromene) in Silicone Oil.

EXAMPLE 2

CR39-type lenses, prepared as described above were subjected to imbibition for 4 hours at 90° C. slurries as above.

The imbibition step required the lenses to be laid concave surface down onto a mould of similar curve which contained the imbibition slurry.

Four CR39 regularly cured lenses were included for comparison.

The results are presented in Table 1 and FIG. 1.

TABLE 1

Slurry's 1, 2 and 3 are in water, 4 in Silicone Oil.

| CR Lens No. | Initial OD @ 390 nm | Subseq. OD @ 390 nm | Slurry 1 OD Change | Slurry 2 OD Change | Slurry 3 OD Change | Slurry 4 OD Change |
|---|---|---|---|---|---|---|
| 9 | 0.0432 | 0.1299 | 0.0867 | 0.0867 | | |
| 12 | 0.0402 | 0.097 | 0.0568 | 0.0568 | | |
| 11 | 0.0037 | 0.0469 | 0.0432 | | 0.0432 | |
| 14 | 0.0403 | 0.0537 | 0.0134 | | 0.0134 | |
| 13 | 0.0403 | 0.2749 | 0.2346 | | | 0.2346 |
| 16 | 0.0434 | 0.4311 | 0.3897 | | | 0.3897 |
| 15 | 0.0397 | 0.3341 | 0.2944 | | | | 0.2944 |
| 10 | 0.0405 | 0.1558 | 0.1153 | | | | 0.1153 |

| CR Lens No. | | Initial Barcol | Final Barcol | Degree of Cure |
|---|---|---|---|---|
| 9 | Slurry 1 | 0 | 4.3 | 66% before |
| 12 | Slurry 1 | 0 | 7.3 | 69% before |
| 11 | Slurry 2 | 0 | 0.7 | |
| 14 | Slurry 2 | 0 | 9 | |
| 13 | Slurry 3 | 0 | 0 | |
| 16 | Slurry 3 | 0 | 10.2 | |
| 15 | Slurry 4 | 0 | 8.7 | |
| 10 | Slurry 4 | 0 | 9.7 | |

The increase in Optical Density (OD) indicates a significant increase in imbibition uptake rates.

EXAMPLE 2

Figure 2:
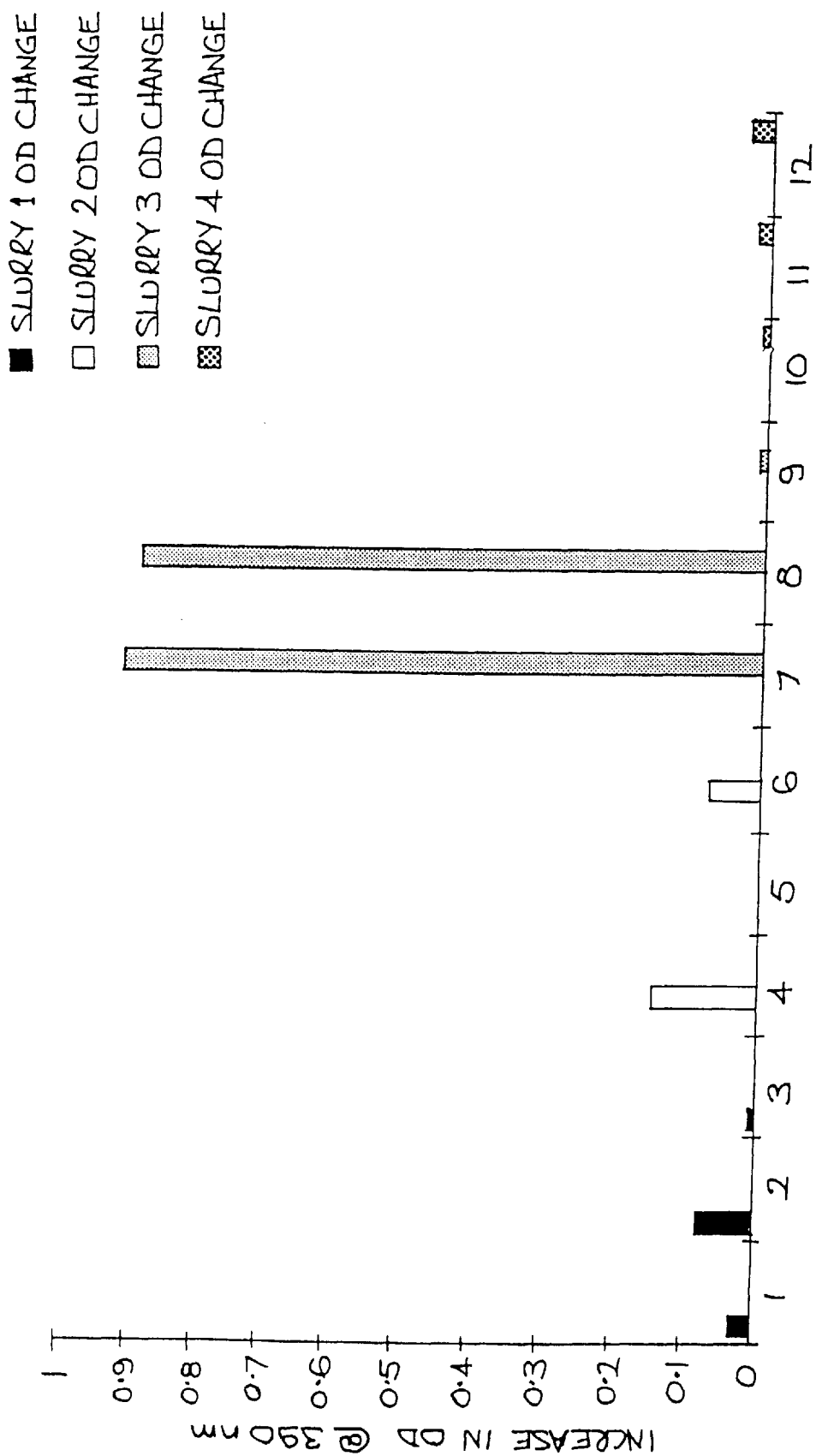
FIG. 2 is a plot of increase in optical density (OD) @ 390 nm upon imbibition for 4 hours @ 90° C. for CR39-type partially cured lenses using Imbibition Slurries 1–4 described below, but with carriers reversed from those illustrated in FIG. 1.

Example 1 was repeated with the carriers for the photochromic dyes reversed. The results are presented in Table 2 and FIG. 2.

TABLE 2

Photochrome Carrier reversed, i.e. Slurry's 1, 2 and 3, in Silicone Oil and 4 in water.

| CR Lens No. | Initial OD @ 390 nm | Subseq. OD @ 390 nm | OD Change | Slurry 1 OD Change | Slurry 2 OD Change | Slurry 3 OD Change | Slurry 4 OD Change |
|---|---|---|---|---|---|---|---|
| 17 | 0.0469 | 0.0811 | 0.0342 | 0.0342 | | | |
| 20 | 0.0398 | 0.1233 | 0.0835 | 0.0835 | | | |
| Plano | 0.0994 | 0.1102 | 0.0108 | 0.0108 | | | |
| 19 | 0.0379 | 0.1813 | 0.1434 | | 0.1434 | | |
| Plano | 0.0386 | 0.1113 | 0.0727 | | 0.0727 | | |
| 21 | 0.0994 | 1.0144 | 0.915 | | | 0.915 | |
| 22 | 0.0386 | 0.928 | 0.8894 | | | 0.8894 | |
| Plano | 0.0994 | 0.1106 | 0.0112 | | | 0.0012 | |
| 23 | 0.0391 | 0.0496 | 0.0105 | | | | 0.0105 |
| 24 | 0.0436 | 0.0643 | 0.0207 | | | | 0.0207 |
| Plano | 0.0994 | 0.1241 | 0.0347 | | | | 0.0347 |

| CR Lens No. | | Initial Barcol | Final Barcol | Degree of Cure |
|---|---|---|---|---|
| 17 | Slurry 1 | 0 | | 81% after |
| 20 | Slurry 1 | 0 | | 82% after |
| Plano | Slurry 1 | 0 | | |
| 19 | Slurry 2 | | | |
| Plano | Slurry 2 | | | |
| 21 | Slurry 3 | | | |
| 22 | Slurry 3 | | | |
| Plano | Slurry 3 | | | |
| 23 | Slurry 4 | | | |
| 24 | Slurry 4 | | | |
| Plano | Slurry 4 | | | |

A significant improvement was achieved with BuPw8 in Silicone Oil.

EXAMPLE 3

Figure 3:
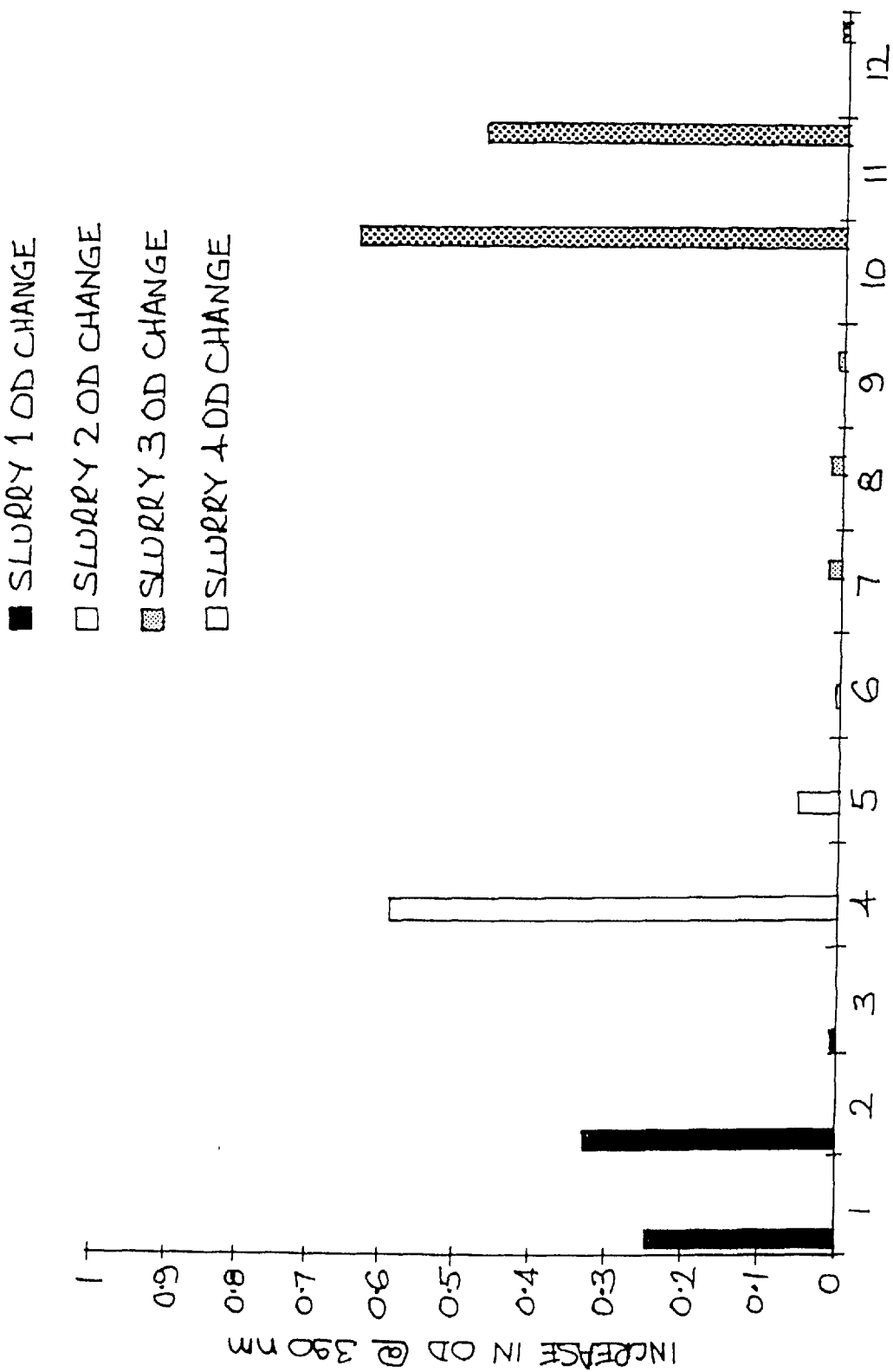
FIG. 3 is a similar plot to FIG. 1 but with imbibition for 4 hours @ 100° C.

Example 1 was repeated except that imbibition conditions were 4 hours at 100° C. The results are presented in Table 3 and FIG. 3.

TABLE 3

Photochrome Carriers as per Table 1.

| CR Lens No. | Initial OD @ 390 nm | Subseq. OD @ 390 nm | OD Change | Slurry 1 OD Change | Slurry 2 OD Change | Slurry 3 OD Change | Slurry 4 OD Change |
|---|---|---|---|---|---|---|---|
| 33 | 0.0392 | 0.2922 | 0.253 | 0.253 | | | |
| 26 | 0.0434 | 0.3801 | 0.3367 | 0.3367 | | | |
| Plano | 0.0957 | 0.1039 | 0.0082 | 0.0082 | | | |
| 34 | 0.0382 | 0.6286 | 0.5904 | | 0.5904 | | |
| 37 | 0.0415 | 0.0962 | 0.0547 | | 0.0547 | | |
| Plano | 0.096 | 0.1012 | 0.0052 | | 0.0052 | | |
| 35 | 0.0383 | 0.0565 | 0.0182 | | | 0.0182 | |
| 28 | 0.0401 | 0.0576 | 0.0175 | | | 0.0175 | |
| Plano | 0.9059 | 0.1048 | 0.0089 | | | 0.0089 | |
| 36 | 0.0383 | 0.6806 | 0.6423 | | | | 0.6423 |
| 29 | 0.041 | 0.5169 | 0.4769 | | | | 0.4769 |
| Plano | 0.1098 | 0.1212 | 0.0115 | | | | 0.0115 |

| CR Lens No. | | Initial Barcol | Final Barcol | Degree of Cure |
|---|---|---|---|---|
| 33 | Slurry 1 | | 2.1 | |
| 26 | Slurry 1 | | 10.9 | 85% before |
| Plano | Slurry 1 | | | |
| 34 | Slurry 2 | 0 | 0 | |
| 37 | Slurry 2 | | 6 | |
| Plano | Slurry 2 | | | |
| 35 | Slurry 3 | | 0 | 64% before |
| 28 | Slurry 3 | | 12.2 | |
| Plano | Slurry 3 | | | |
| 36 | Slurry 4 | 0 | | |
| 29 | Slurry 4 | | | |
| Plano | Slurry 4 | | | |

EXAMPLE 4

Figure 4:
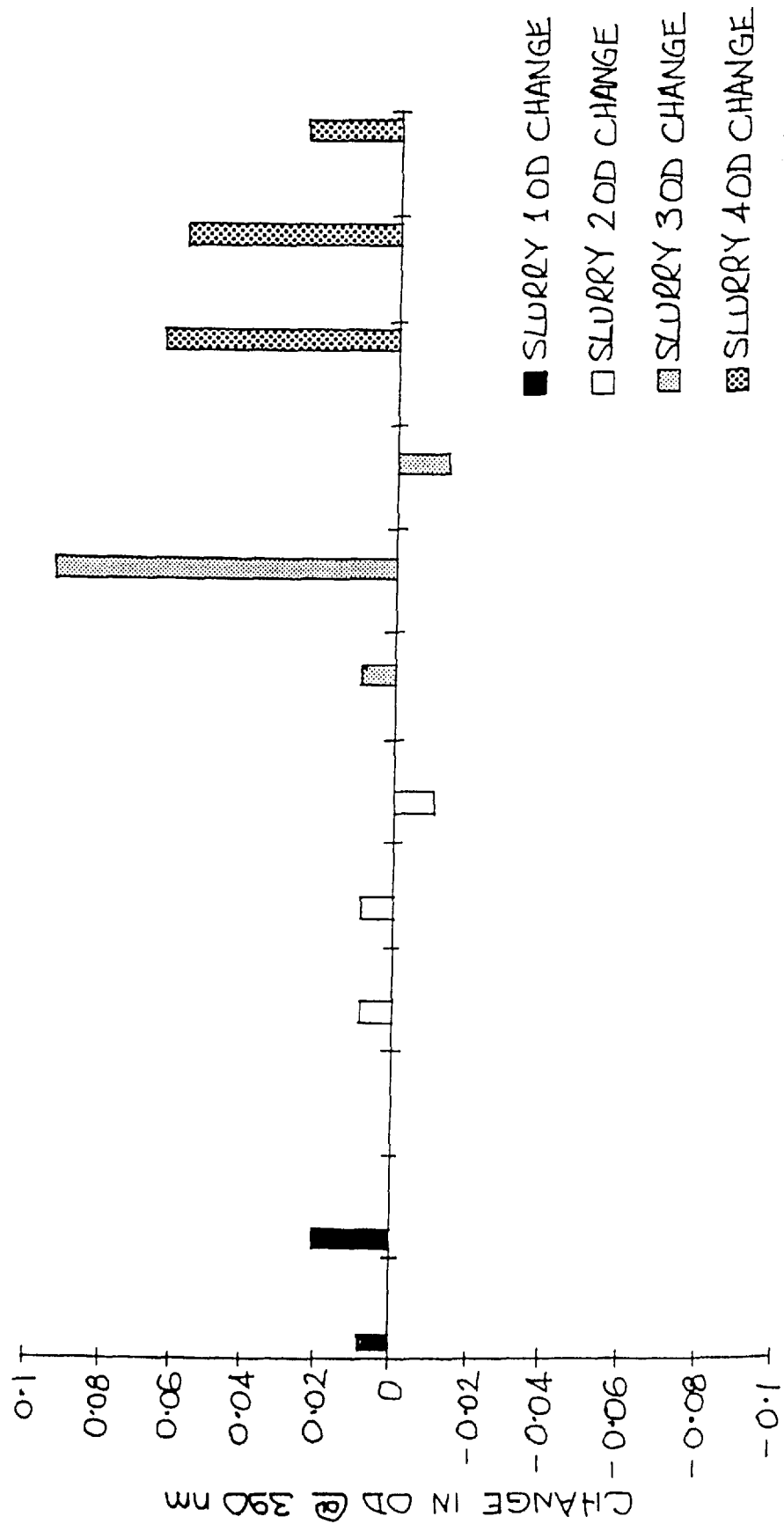
FIG. 4 is a similar plot to FIG. 3 but using Spectralite-type partially cured (UF+Thermal) lenses.

Example 3 was repeated except that Spectralite-type partially cured UV+Thermal) lenses, prepared as described above, were used in place of the CR39-type lenses. The results are presented in Table 4 and FIG. 4.

TABLE 4

Photochromic Carrier as per Table 1.

| Spect UV + Th Lens No. | Initial OD @ 390 nm | Subseq OD @ 390 nm | OD Change | Slurry 1 OD Change | Slurry 2 OD Change | Slurry 3 OD Change | Slurry 4 OD Change |
|---|---|---|---|---|---|---|---|
| 33 | 0.1097 | 0.119 | 0.0093 | 0.0093 | | | |
| 25 | 0.1075 | 0.1291 | 0.0216 | 0.0216 | | | |
| Plano | 0.2495 | 0.2452 | −0.0043 | | | | |
| 34 | 0.106 | 0.1147 | 0.0087 | | 0.0087 | | |
| 26 | 0.1043 | 0.1132 | 0.0089 | | 0.0089 | | |
| Plano | 0.2525 | 0.2414 | −0.0111 | | −0.0111 | | |
| 35 | 0.1097 | 0.1188 | 0.0091 | | | 0.0091 | |
| 27 | 0.104 | 0.1969 | 0.0929 | | | 0.0929 | |
| Plano | 0.2637 | 0.2493 | −0.0144 | | | −0.0144 | |
| 36 | 0.1027 | 0.1659 | 0.0632 | | | | 0.0632 |
| 28 | 0.1073 | 0.1645 | 0.0572 | | | | 0.0572 |
| Plano | 0.2459 | 0.2712 | 0.0253 | | | | 0.0253 |

| Spect UV + Th Lens No. | | Initial Barcol | Final Barcol | Degree of Cure |
|---|---|---|---|---|
| 33 | Slurry 1 | 18.7 | 12.8 | |
| 25 | Slurry 1 | | 17.6 | |
| Plano | Slurry 1 | | | |
| 34 | Slurry 2 | | 18.2 | |
| 26 | Slurry 2 | | 16.3 | |
| Plano | Slurry 2 | | | |
| 35 | Slurry 3 | | 18.9 | |
| 27 | Slurry 3 | | 19.8 | |
| Plano | Slurry 3 | | | |
| 36 | Slurry 4 | | 16.8 | 87% before |
| 28 | Slurry 4 | 16.4 | 15 | 89% before |
| Plano | Slurry 4 | | | |

The results were significantly poorer than those achieved with the CR39-type lenses.

EXAMPLE 5

Figure 5:
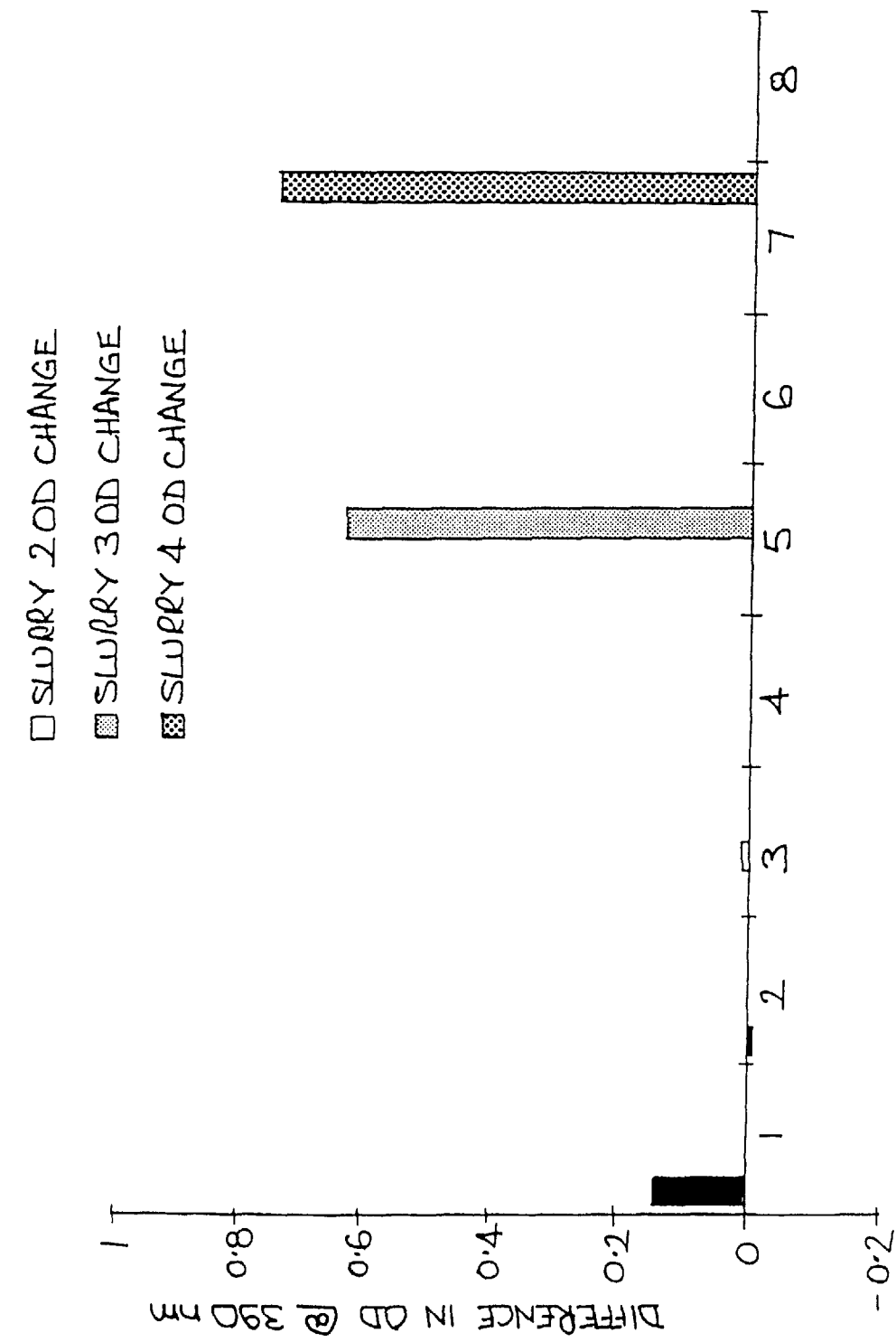
FIG. 5 is a similar plot to FIG. 4 but with imbibition for 4 hours @ 90° C. and with the Spectralite-type partially cured (UV) lenses quenched in ice water.

Example 4 was repeated, but ensuring the cure stopped by quenching the lenses. The Spectralite-type lenses into ice water. The results are presented in Table 5 and FIG. 5.

TABLE 5

This experiment is after 4 hours at 90° C. with the Photochrome Carrier as per Table 1, using Quenched partially cured Spectralite-type lenses.

| Spect UV + UV Lens No. | Initial OD @ 390 nm | Subseq OD @ 390 nm | OD Change | Slurry 1 OD Change | Slurry 2 OD Change | Slurry 3 OD Change | Slurry 4 OD Change |
|---|---|---|---|---|---|---|---|
| UVS1 | 0.1514 | 0.3 | 0.1486 | 0.1486 | | | |
| Plano SP1 | 0.2584 | 0.2506 | −0.0078 | −0.0078 | | | |
| UVS2 | 0.1478 | 0.1581 | 0.0103 | | 0.0103 | | |
| UVS3 | 0.1462 | 0.7764 | 0.6302 | | | 0.6302 | |
| UVS4 | 0.1536 | 0.894 | 0.7404 | | | | 0.7404 |
| Plano SP2 | 0.25 | 0.2526 | 0.0026 | | | | 0.0026 |

The imbibition was conducted at 90° C. and the imbibition uptake rate improved markedly.

EXAMPLE 6

Figure 6:
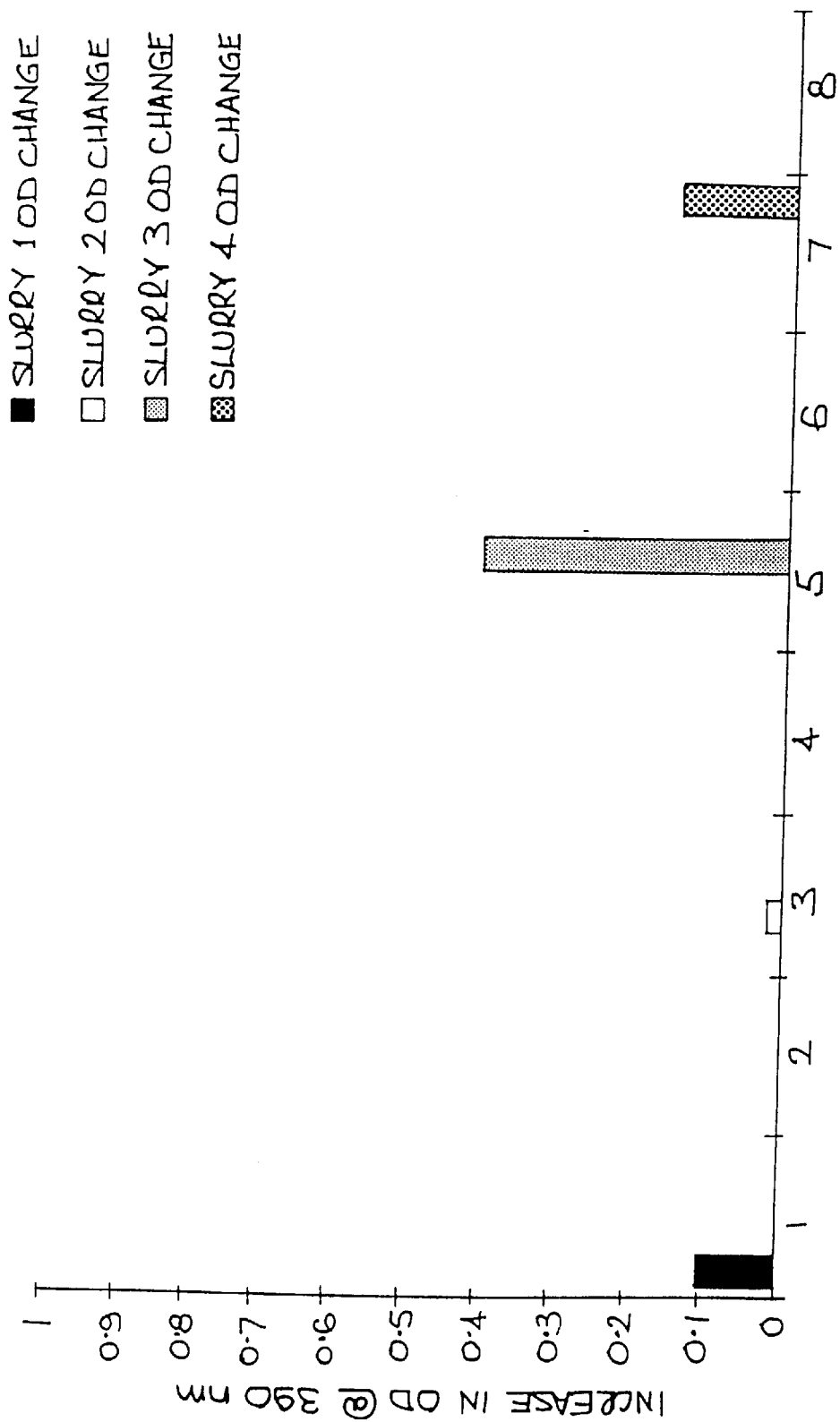
FIG. 6 is a similar plot to FIG. 5 but using UV+Thermal partial cure.

Example 5 was repeated with Spectralite-type lenses in which the initial partial included a UV+Thermal treatment. The thermal treatment was conducted at 100° C. for 4 hours. The results are presented in Table 6 and FIG. 6.

TABLE 6

This experiment is after 4 hours at 90° C. with the Photochome Carrier as per the original sequence, using the quenched, partially cured (UV + Thermal) spectralite lens.

| Spect UV + Th Lens No. | Initial OD @ 390 nm | Subseq OD @ 390 nm | OD Change | Slurry 1 OD Change | Slurry 2 OD Change | Slurry 3 OD Change | Slurry 4 OD Change |
|---|---|---|---|---|---|---|---|
| UVTS1 | 0.1243 | 0.2317 | 0.1074 | 0.1074 | | | |
| Plano | 0.2584 | 0.2506 | −0.0078 | | | | |
| UVTS2 | 0.1186 | 0.137 | 0.0184 | | 0.0184 | | |
| UVTS3 | 0.1202 | 0.5257 | 0.4055 | | | 0.4055 | |
| UVTS4 | 0.1211 | 0.2742 | 0.1531 | | | | 0.1531 |
| Plano | 0.25 | 0.2526 | 0.0026 | | | | 0.0026 |

| Spect UV + Th Lens No. | | Initial Barcol | Final Barcol | Degree of Cure |
|---|---|---|---|---|
| UVTS1 | Slurry 1 | 9 | | |
| Plano | Slurry 1 | | | |
| UVTS2 | Slurry 2 | | | |
| UVTS3 | Slurry 3 | | | |
| UVTS4 | Slurry 4 | | | |
| Plano | Slurry 4 | | | |

Slurry's 1, 2 and 3 are in water

EXAMPLE 7

In order to improve imbibition uptake rates further, photochromic coating compositions comprising a photochromic dye and a polymerisable carrier composition (CR39-type monomer or Spectralite-type monomer blend) was used as the imbibition slurry, with the slurries being designated 5,6,7 and 8.

Slurry 5—Corn Yellow in CR39 monomer,

Slurry 6—BuPW8 in CR39 monomer,

Slurry 7—Fulgide FG-2 in a Spectralite monomer blend containing a UV initiator,

Slurry 8—Corn Yellow in Spectralite monomer blend containing UV+Thermal initiators.

Figure 7:
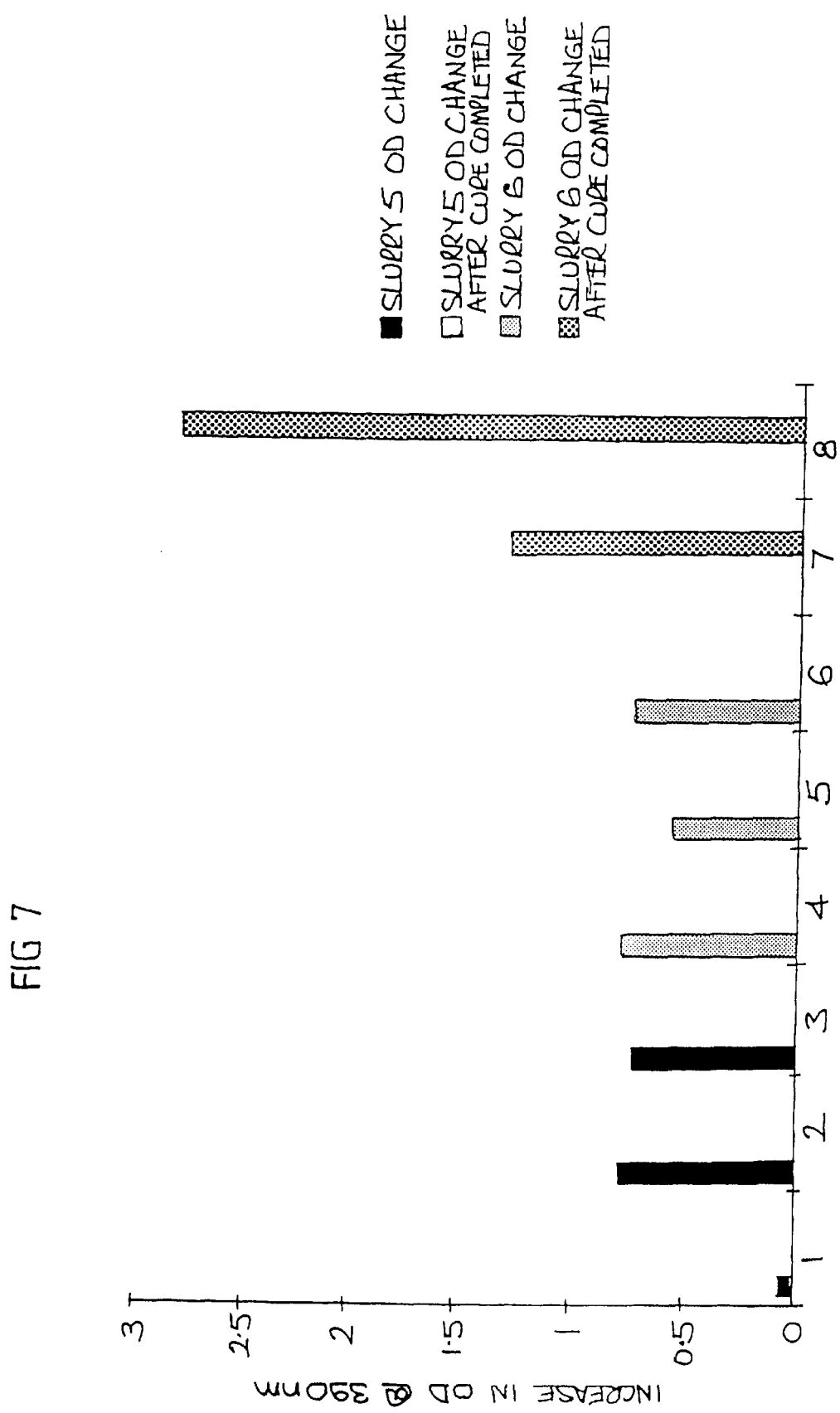
FIG. 7 is a similar plot to FIG. 1 but using imbibition slurries 5 and 6 described below.

The results achieved with CR39-type partially cured lenses are presented in Table 7 and FIG. 7.

TABLE 7

This experiment is after 4 hours at 90° C. with Photochrome Carriers 5 and 6.

| CR Lens No. | Initial OD @ 390 nm | Subseq. OD @ 390 nm | OD Change | Slurry 5 OD Change | Slurry 6 OD Change |
|---|---|---|---|---|---|
| P1 | 0.0953 | 0.1622 | 0.0669 | 0.0669 | |
| C1 | 0.0413 | 0.8221 | 0.7808 | 0.7808 | |
| C2 | 0.0421 | 0.7687 | 0.7266 | 0.7266 | |
| C3 | 0.0427 | 0.8245 | 0.7818 | 0.7818 | |
| C4 | 0.043 | 0.6056 | 0.5626 | 0.5626 | |
| C5 | 0.0405 | 0.7742 | 0.7337 | 0.7337 | |
| C7 | 0.0409 | 1.3372 | 1.2943 | | 1.2943 |
| C9 | 0.0409 | 2.8453 | 2.8044 | | 2.8044 |

TABLE 7-continued

This experiment is after 4 hours at 90° C. with Photochrome Carriers 5 and 6.

| CR Lens No. | | Initial Barcol | Final Barcol | Degree of Cure |
|---|---|---|---|---|
| P1 | Slurry 5 | | 30.2 | |
| C1 | Slurry 5 | | 0 | 65% before |
| C2 | Slurry 5 | | 0 | 85% before |
| C3 | Slurry 5 | | 0 | |
| C4 | Slurry 5 | | 4 | |
| C5 | Slurry 5 | | 0 | |
| C7 | Slurry 6 | | 0 | |
| C9 | Slurry 6 | | 0 | |

Figure 8:
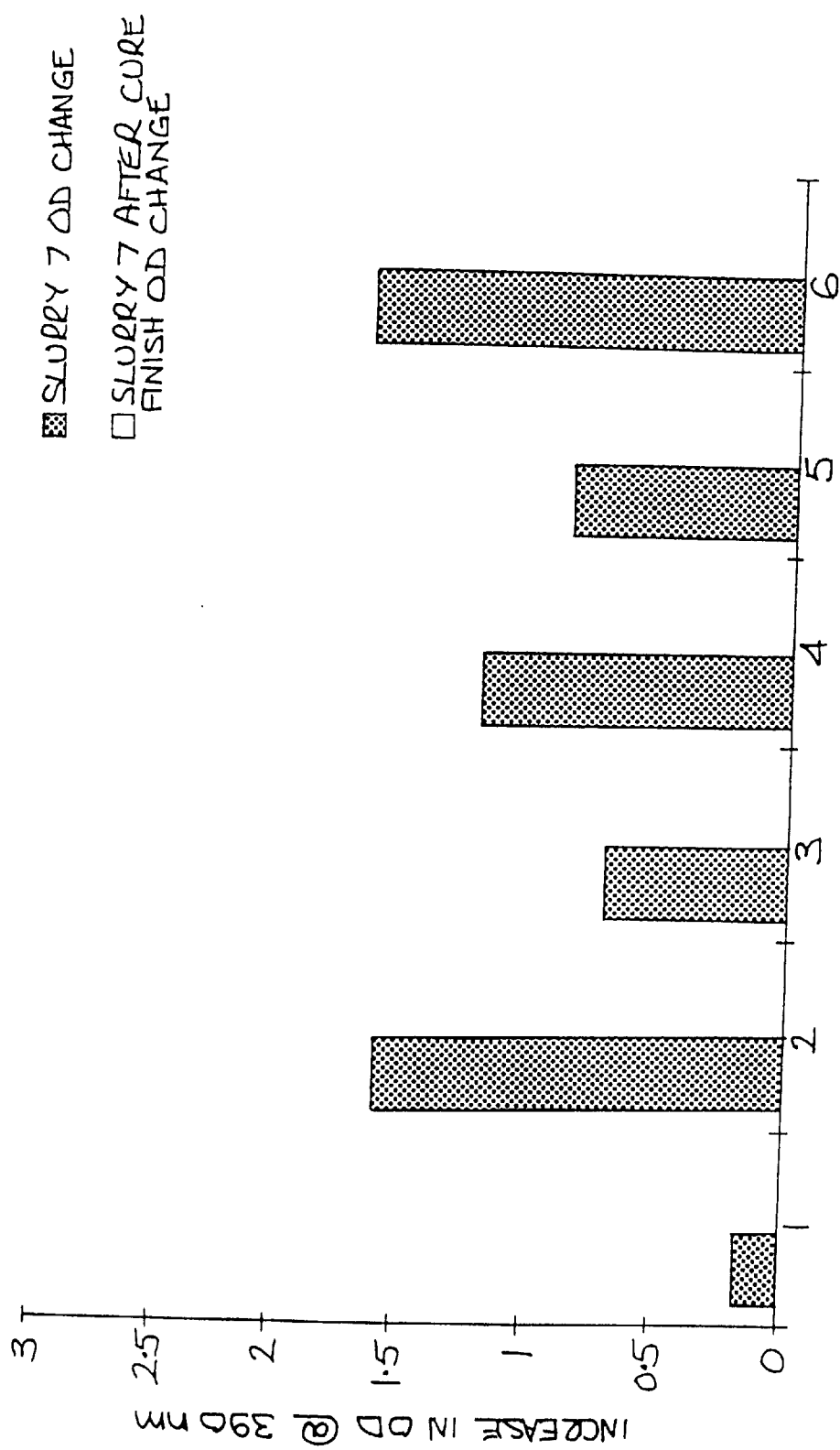
FIG. 8 is a similar plot to FIG. 7 but using Spectralite-type partially cured (UV+UV) lenses and Imbibition Slurry 7 described below.
Figure 9:
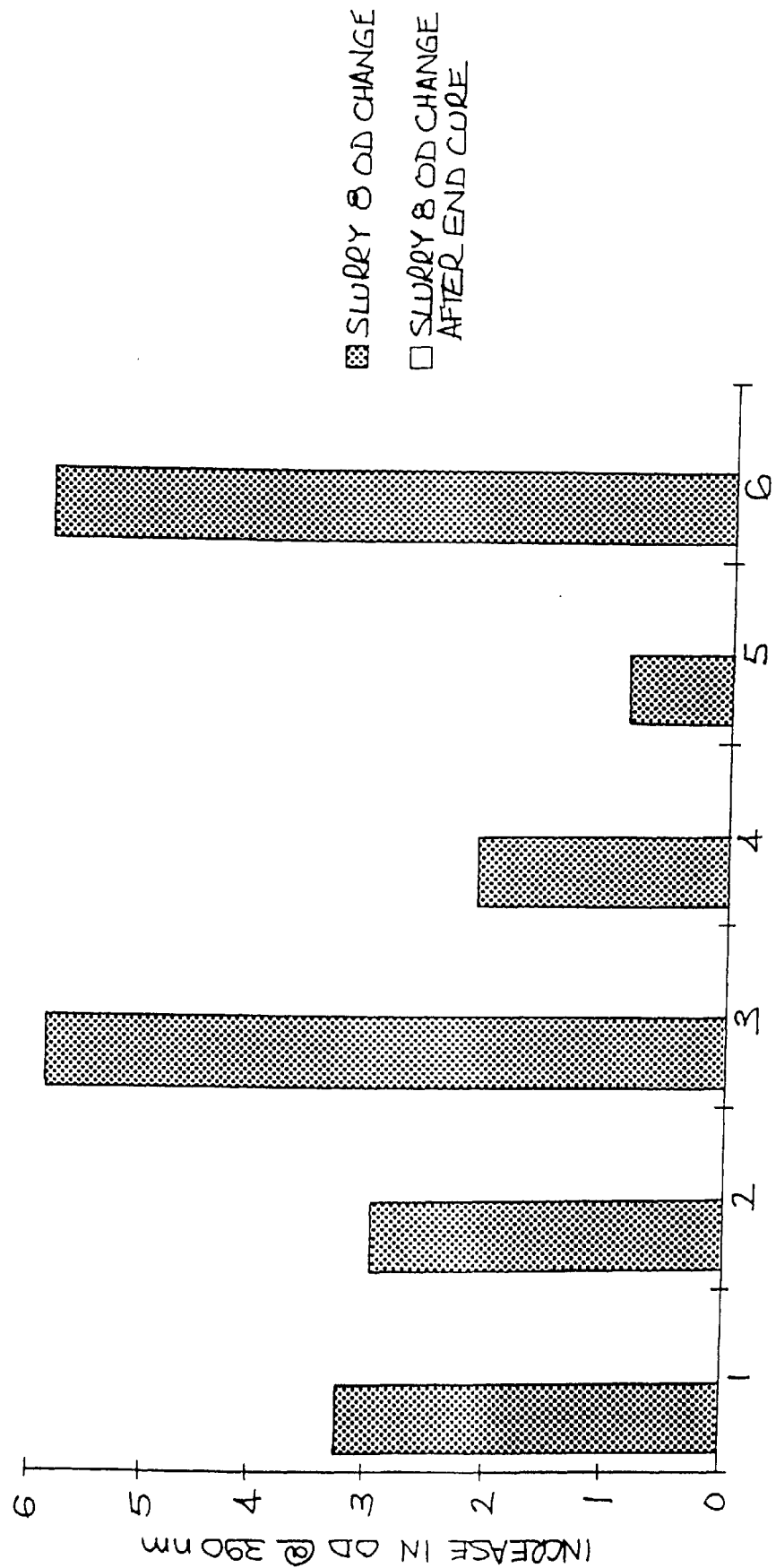
FIG. 9 is a similar plot to FIG. 8 but using Spectralite-type partially cured (UV+Thermal) lenses and Imbibition Slurry 8 described below.

The results achieved with Spectralite-type partially cured UV+UV, and UV+Thermal cures are presented in Table 8 and FIG. 8 and Table 9 and FIG. 9 respectively.

TABLE 8

This experiment is after 4 hours at 90° C. with the Photochome Carrier.

| Spect UV + Th Lens No. | Initial OD @ 390 nm | Subseq OD @ 390 nm | OD Change | Slurry 7 OD Change | |
|---|---|---|---|---|---|
| SP1 | 0.2452 | 0.4304 | 0.1842 | 0.1842 | Slurry 1 |
| SU + U1 | 0.1727 | 1.7667 | 1.594 | 1.594 | Slurry 1 |
| SU + U2 | 0.1778 | 0.8855 | 0.7077 | 0.7077 | Slurry 1 |

TABLE 8-continued

This experiment is after 4 hours at 90° C. with the Photochome Carrier.

| | | | | | |
|---|---|---|---|---|---|
| SU + U3 | 0.1732 | 1.3817 | 1.2085 | 1.2085 | Slurry 2 |
| SU + U4 | 0.1784 | 1.0486 | 0.8702 | 0.8702 | Slurry 2 |
| SU + U5 | 0.1746 | 1.8343 | 1.6597 | 1.6597 | Slurry 2 |

| Spect UV + Th Lens No. | | Initial Barcol | Final Barcol | Degree of Cure |
|---|---|---|---|---|
| SP1 | Slurry 1 | | 26.9 | |
| SU + U1 | Slurry 1 | | 16.5 | 90% before |
| SU + U2 | Slurry 1 | | 25 | 89% before |
| SU + U3 | Slurry 2 | | 21.4 | |
| SU + U4 | Slurry 2 | | 26.7 | |
| SU + U5 | Slurry 2 | | 19.4 | |

TABLE 9

This experiment is after 4 hours at 90° C. with the Photochome Carrier.

| Spect UV + Th Lens No. | Initial OD @ 390 nm | Subseq OD @ 390 nm | OD Change | Slurry 8 OD Change | |
|---|---|---|---|---|---|
| SP2 | 0.2604 | 3.5007 | 3.2403 | 3.2403 | Slurry 8 |
| UU + T1 | 0.1149 | 3.0862 | 2.9713 | 2.9713 | Slurry 8 |

TABLE 9-continued

This experiment is after 4 hours at 90° C. with Photochome Carrier.

| | | | | | |
|---|---|---|---|---|---|
| UU + T2 | 0.1072 | 6 | 5.8928 | 5.8928 | Slurry 8 |
| UU + T3 | 0.1149 | 2.2485 | 2.1336 | 2.1336 | Slurry 8 |
| UU + T4 | 0.1133 | 0.9855 | 0.8722 | 0.8722 | Slurry 8 |
| UU + T5 | 0.1173 | 6 | 5.8827 | 5.8827 | Slurry 8 |

| Spect UV + Th Lens No. | | Initial Barcol | Final Barcol | Degree of Cure |
|---|---|---|---|---|
| SP2 | Slurry 8 | | 25.4 | 90.4% before |
| UU + T1 | Slurry 8 | | 18.6 | 87.8% before |
| UU + T2 | Slurry 8 | | 15.9 | |
| UU + T3 | Slurry 8 | | 20.1 | |
| UU + T4 | Slurry 8 | | 17 | |
| UU + T5 | Slurry 8 | | 15.7 | |

The imbibition dye uptake rates again improved significantly.

EXAMPLE 8

In order to further improve imbibition uptake rates, photochromic coating compositions comprising a photochromic dye and polymerisable carrier composition as in Example 7 except that the CR39-type monomer and Spectralite-type monomer blend contain no initiator.

Figure 10:
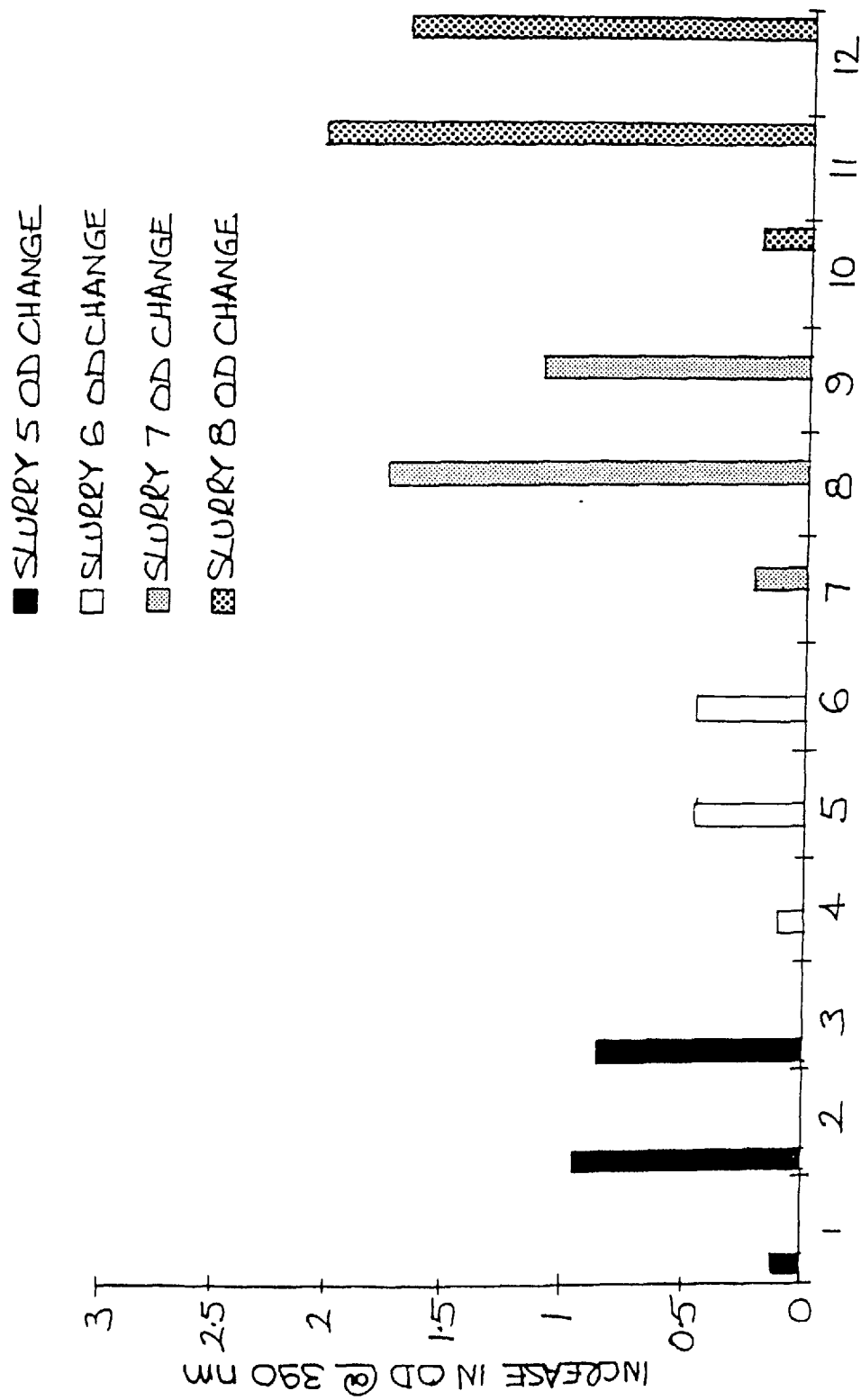
FIG. 10 is a plot of increase in OD @ 390 nm upon imbibition for 2 hours @ 90° C. for CR39-type partially cured lenses using imbibition slurries 5–8 but with CR39 monomer as carrier in the absence of initiator.

The results achieved with CR39 partially cured lenses are presented in Table 10 and FIG.10.

TABLE 10

This seventh experiment is after 2 hours at 90° C. with the Photochome Carrier changed to be the relevant un-initiated monomer to see if it can be hardened up.

| CR Lens No. | Initial OD @ 390 nm | Subseq OD @ 390 nm | OD Change | Slurry 5 OD Change | Slurry 6 OD Change | Slurry 7 OD Change | Slurry 8 OD Change |
|---|---|---|---|---|---|---|---|
| CR39 Full Cured | 0.1063 | 0.2377 | 0.1314 | 0.1314 | | | |
| Half Cured CR39 | 0.0467 | 1.0028 | 0.9557 | 0.9557 | | | |
| Half then complete | 0.0459 | 0.902 | 0.8561 | 0.8561 | | | |
| CR39 Full Cured | 0.095 | 0.1903 | 0.0953 | | 0.0953 | | |
| Half Cured CR39 | 0.0416 | 0.4955 | 0.4539 | | 0.4539 | | |
| Half then complete | 0.0453 | 0.5017 | 0.4474 | | 0.4474 | | |
| CR39 Full Cured | 0.0937 | 0.3056 | 0.2119 | | | 0.2119 | |
| Half Cured CR39 | 0.0441 | 1.7999 | 1.7558 | | | 1.7558 | |
| Half then complete | 0.0578 | 1.1694 | 1.1116 | | | 1.1116 | |
| CR39 Full Cured | 0.0933 | 0.297 | 0.2037 | | | | 0.2037 |
| Half Cured CR39 | 0.0473 | 2.0827 | 2.0354 | | | | 2.0354 |
| CR39 Half then complete | 0.0489 | 1.7383 | 1.6894 | | | | 1.6894 |

TABLE 10-continued

This seventh experiment is after 2 hours at 90° C. with the Photochome Carrier changed to be the relevant un-initiated monomer to see if it can be hardened up.

| CR Lens No. | | Initial Barcol | Final Barcol | Degree of Cure |
|---|---|---|---|---|
| CR39 Full Cured | Slurry 5 | 30.7 | | |
| Half Cured CR39 | Slurry 5 | 0 | | |
| Half then complete | Slurry 5 | 0 | | |
| CR39 Full Cured | Slurry 6 | | | |
| Half Cured CR39 | Slurry 6 | | | |
| Half then complete | Slurry 6 | | | |
| CR39 Full Cured | Slurry 7 | | | |
| Half Cured CR39 | Slurry 7 | | | |
| Half then complete | Slurry 7 | | | |
| CR39 Full Cured | Slurry 8 | | | |
| Half Cured CR39 | Slurry 8 | | | |
| Half then complete | Slurry 8 | | | |

Figure 11:
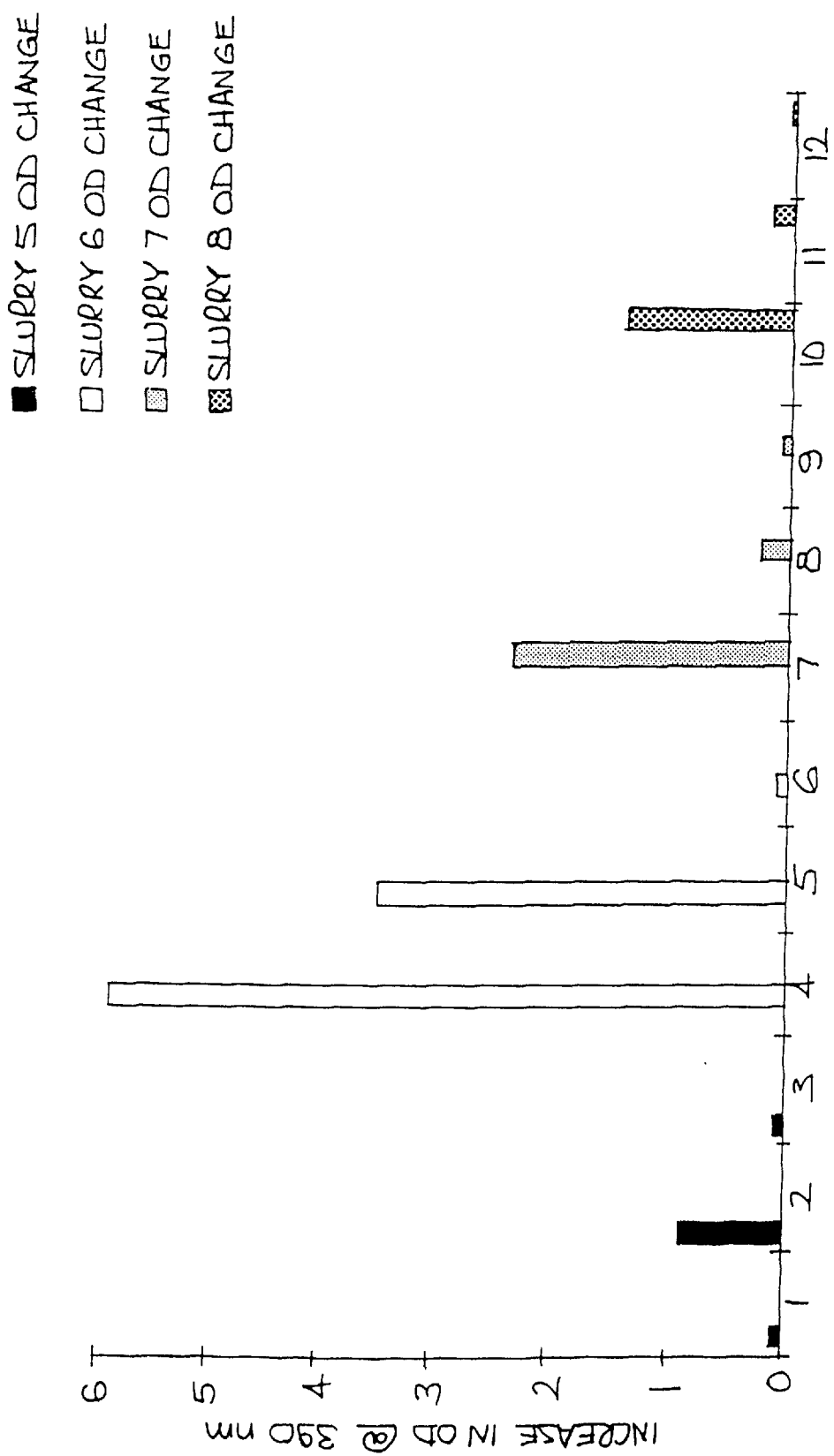
FIG. 11 is a similar plot to FIG. 10 but using Spectralite-type (UV+UV) partially cured lenses and Spectralite-type monomer blends as carrier and in the absence of initiator.
Figure 12:
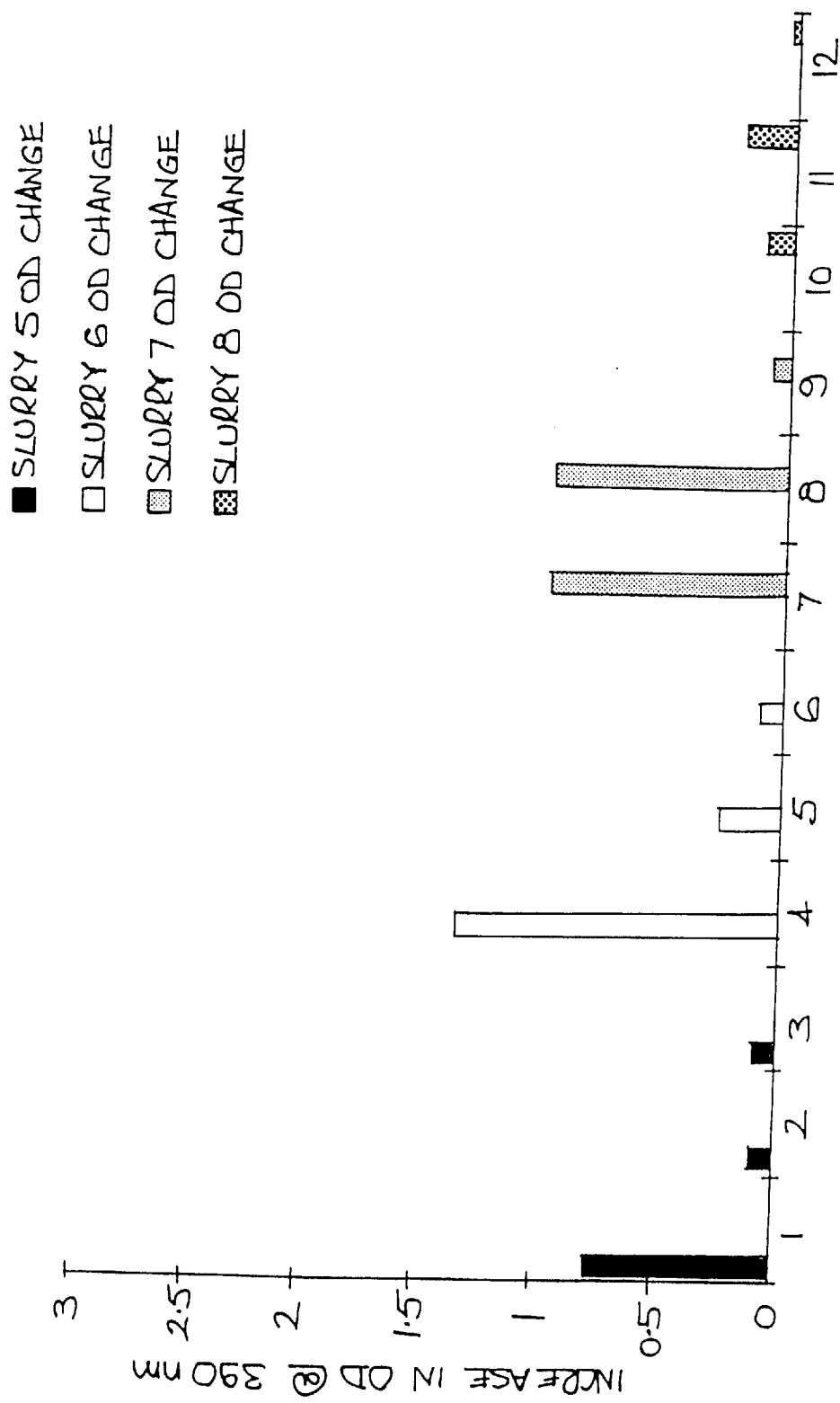
FIG. 12 is a similar plot to FIG. 11 but using Spectralite-type partially cured (UV+Thermal) lenses.

The results achieved with Spectralite-type partially cured lenses are presented in Tables 11 and 12 and FIGS. 11 and 12.

TABLE 11

This seventh experiment is after 2 hours at 90° C. with the Photochome Carrier changed to be the relevant un-initiated monomer to see if it can be hardened up.

| Spect UV + UV Lens No. | Initial OD @ 390 nm | Subseq OD @ 390 nm | OD Change | Slurry 5 OD Change | Slurry 6 OD Change | Slurry 7 OD Change | Slurry 8 OD Change |
|---|---|---|---|---|---|---|---|
| UVS 1st | 0.1235 | 0.2328 | 0.1093 | 0.1093 | | | |
| 2nd UVS | 0.1839 | 1.0764 | 0.8925 | 0.8925 | | | |
| Spec-tralite | 0.2576 | 0.3466 | 0.087 | 0.087 | | | |
| UVS 1st | 0.1235 | 6 | 5.8765 | | 5.8765 | | |
| 2nd UVS | 0.1776 | 3.6527 | 3.4751 | | 3.4751 | | |
| Spec-tralite | 0.2479 | 0.3308 | 0.0829 | | 0.0829 | | |
| UVS 1st | 0.1224 | 2.4701 | 2.3477 | | | 2.3477 | |
| 2nd UVS | 0.1709 | 0.4218 | 0.2509 | | | 0.2509 | |
| Spec-tralite | 0.2455 | 0.3212 | 0.0757 | | | 0.0757 | |
| UVS 1st | 0.1214 | 1.5362 | 1.4148 | | | | 1.4148 |
| 2 UVS | 0.1741 | 0.3742 | 0.2001 | | | | 0.2001 |
| Spec-tralite | 0.2499 | 0.2831 | 0.0332 | | | | 0.0332 |

| Spect UV + UV Lens No. | | Initial Barcol | Final Barcol | Degree of Cure |
|---|---|---|---|---|
| UVS 1st | Slurry 5 | 17 | | |
| 2nd UVS | Slurry 5 | 0 | | 72% before |
| Spectralite | Slurry 5 | 25.3 | | |
| UVS 1st | Slurry 6 | | | |
| 2nd UVS | Slurry 6 | | | |
| Spectralite | Slurry 6 | | | |
| UVS 1st | Slurry 7 | | | |
| 2nd UVS | Slurry 7 | | | |
| Spectralite | Slurry 7 | | | |
| UVS 1st | Slurry 8 | | | |
| 2 UVS | Slurry 8 | | | |
| Spectralite | Slurry 8 | | | |

TABLE 12

| Spect UV + Th Lens No. | Initial OD @ 390 nm | Subseq OD @ 390 nm | OD Change | Slurry 5 OD Change | Slurry 6 OD Change | Slurry 7 OD Change | Slurry 8 OD Change |
|---|---|---|---|---|---|---|---|
| UVTS 1st half | 0.1264 | 0.9051 | 0.7787 | 0.7787 | | | |
| 2nd UVTS (full) | 0.118 | 0.2043 | 0.0863 | 0.0863 | | | |
| Spectralite | 0.2576 | 0.3466 | 0.097 | 0.087 | | | |
| UVTS 1st half | 0.1219 | 1.47 | 1.3481 | | 1.3481 | | |
| 2nd UVTS (full) | 0.1187 | 0.367 | 0.2483 | | 0.2483 | | |
| Spectralite | 0.2479 | 0.3308 | 0.0829 | | 0.0829 | | |
| UVTS 1st | 0.1196 | 1.108 | 0.9884 | | | 0.9884 | |

TABLE 12-continued

| | | | | | |
|---|---|---|---|---|---|
| half | | | | | |
| 2nd UVTS (full) | 0.1299 | 1.1132 | 0.9833 | 0.9833 | |
| Spectralite | 0.2455 | 0.3212 | 0.0757 | 0.0757 | |
| UVTS 1st half | 0.1178 | 0.2307 | 0.1129 | | 0.1129 |
| 2nd UVTS (full) | 0.1129 | 0.3291 | 0.2162 | | 0.2162 |
| Spectralite | 0.2499 | 0.2831 | 0.0332 | | 0.0332 |

| Spect UV + Th Lens No. | | Initial Barcol | Final Barcol | Degree of Cure |
|---|---|---|---|---|
| UVTS 1st half | Slurry 5 | 9 | | |
| 2nd UVTS (full) | Slurry 5 | 10.3 | | |
| Spectralite | Slurry 5 | 25.3 | | |
| UVTS 1st half | Slurry 6 | | | |
| 2nd UVTS (full) | Slurry 6 | | | |
| Spectralite | Slurry 6 | | | |
| UVTS 1st half | Slurry 7 | | | |
| 2nd UVTS (full) | Slurry 7 | | | |
| Spectralite | Slurry 7 | | | |
| UVTS 1st half | Slurry 8 | | | |
| 2nd UVTS (full) | Slurry 8 | | | |
| Spectralite | Slurry 8 | | | |

In the Figures, the legends are as follows:
For FIG. 10:
1. Is a fully cured CR39 lens.
2. Is a partially cured lens without any further cure.
3. Is a partially cured lens which has been removed from the mould and then passed through the full cure cycle before imbibition, but whose surface is still soft.
4. Is a fully cured CR39 lens.
5. Is a partially cured lens without any further cure.
6. Is a partially cured lens which has been removed from the mould and then passed through the full cure cycle before imbibition, but whose surface is still soft.
7. Is a fully cured CR39 lens.
8. Is a partially cured lens without any further cure.
9. Is a partially cured lens which has been removed from the mould and then passed through the full cure cycle before imbibition, but whose surface is still soft.
10. Is a fully cured CR39 lens.
11. Is a partially cured lens without any further cure.
12. Is a partially cured lens which has been removed from the mould and then passed through the full cure cycle before imbibition, but whose surface is still soft.

For FIG. 11:
1. (UVS 1st) Is a partially cured UV+UV Spectralite lens which was cured too far as it was not quenched.
2. (2nd UVS) Is a partially cured UV+UV Spectralite lens similar to Example 5 which was cured less due to the quenching at the end of the first stage of the cure.
3. (Spectralite) Is a fully cured Spectralite lens of normal cure.
4. (UVS 1st) Is a partially cured UV+UV Spectralite lens which was cured too far as it was not quenched.
5. (2nd UVS) Is a partially cured UV+UV Spectralite lens similar to Example 5 which was cured less due to the quenching at the end of the first stage of the cure.
6. (Spectralite) Is a fully cured Spectralite lens of normal cure.
7. (UVS 1st) Is a partially cured UV+UV Spectralite lens which was cured too far as it was not quenched.
8. (2nd UVS) Is a partially cured UV+UV Spectralite lens similar to Example 5 which was cured less due to the quenching at the end of the first stage of the cure.
9. (Spectralite) Is a fully cured Spectralite lens of normal cure.
10. (UVS 1st) Is a partially cured UV+UV Spectralite lens which was cured too far as it was not quenched.
11. (2nd UVS) Is a partially cured UV+UV Spectralite lens similar to Example 5 which was cured less due to the quenching at the end of the first stage of the cure.
12. (Spectralite) Is a fully cured Spectralite lens of normal cure.

For FIG. 12:
1. (UVTS 1st half) Is a partially cured UV+Thermal Spectralite lens which was cured too far as it was not quenched.
2. (2nd UVTS) Is a partially cured UV+Thermal Spectralite lens similar to Example 5 which was cured less due to the quenching at the end of the first stage of the cure and then subsequently fully cured out of the mould.
3. (Spectralite) Is a fully cured Spectralite lens of normal cure.
4. (UVTS 1st half) Is a partially cured UV+Thermal Spectralite lens which was cured too far as it was not quenched.
5. (2nd UVTS) Is a partially cured UV+Thermal Spectralite lens similar to Example 5 which was cured less due to the quenching at the end of the first stage of the cure and then subsequently fully cured out of the mould.
6. (Spectralite) Is a fully cured Spectralite lens of normal cure.
7. (UVTS 1st half) Is a partially cured UV+Thermal Spectralite lens which was cured too far as it was not quenched.
8. (2nd UVTS) is a partially cured UV+Thermal Spectralite lens similar to Example 5 which was cured less due to the quenching t the end of the first stage of the cure and then subsequently fully cured out of the mould.
9. (Spectralite) Is a fully cured Spectralite lens of normal cure.
10. (UVTS 1st half) Is a partially cured UV+Thermal Spectralite lens which was cured too far as it was not quenched.
11. (2nd UVTS) Is a partially cured UV+Thermal Spectralite lens which was cured less due to the quenching at the end of the first stage of the cure and then subsequently fully cured out of the mould.

12. (Spectralite) Is a fully cured Spectralite lens of normal cure.

Finally, it is to be understood that various other modifications and/or alterations may be made without departing from the spirit of the present invention as outlined herein.

We claim:

1. A process for preparing a cross-linked polymeric article, which process includes
   providing
   a cross-linkable polymeric casting composition; and
   a photochromic composition;
   subjecting the cross-linkable polymeric casting composition to partial cure, such that the polymer reaches or exceeds its point of gelation;
   contacting the partially cured gelled polymer with the photochromic composition for a period sufficient for transfer of the dye or pigment from the photochromic composition to the gelled polymer by permeation; and
   curing the partially cured gelled polymer.

2. A process according to claim 1 wherein the cross-linkable polymeric casting composition is a cross-linkable polymeric casting composition including a monomer or monomers including a polymerisable double bond.

3. A process according to claim 2 wherein the polymerisable monomer(s) is selected from one or more of the group consisting of methacrylates, acrylates, vinyls, vinyl ethers, allyls, aromatic olefins, ethers, polythiols and epoxies.

4. A process according to claim 3 wherein the partial curing step includes
   enclosing the cross-linkable polymeric casting composition between a pair of moulds; and
   subjecting the cross-linkable polymeric casting composition to a first partial cure utilising an ultraviolet (UV), cationic or thermal initiator or mixtures thereof.

5. A process according to claim 4 further including subjecting the partially cured polymer to a quenching step.

6. A process according to claim 5 wherein the gelled polymer formed in the partial curing step is contacted with said photochromic composition in a bath maintained at a temperature of approximately 100° C. or less.

7. A process according to claim 6 wherein the photochromic composition includes at least one photochromic dye selected from the group consisting of anthraquinones, phthalocyanines, spiro-oxazines, chromenes, pyrans, and fulgides.

8. A process according to claim 7 wherein the photochromic composition includes a photochromic dye dissolved or dispersed in a suitable solvent.

9. A process according to claim 8 wherein the solvent is a silicone oil or fluorinated organic solvent.

10. A process according to claim 9 wherein the gelled polymer is subjected to a final ultraviolet (UV) or thermal cure.

11. A process according to claim 3 wherein the photochromic coating composition is a coating composition applied to a surface of the gelled polymer formed in the partial curing step.

12. A process according to claim 11 wherein the photochromic coating composition includes
    a photochromic dye;
    a film forming polymer; and
    a solvent therefor.

13. A process according to claim 12 wherein the film forming polymer is selected from one or more of the group consisting of polyvinyl chloride, polyvinylacetate, polyurethanes, polyvinylbutyral, copolymers of vinyl chloride and vinyl acetate, copolymers of vinyl chloride and vinylidene chloride, polyvinyl propionate, cellulose acetate butyrate, and polymerizates of lower alkyl ($C_1$ to $C_4$) esters or acrylic and methacrylic acid.

14. A process according to claim 12 or 13 wherein the solvent is selected from the group consisting of toluene, benzene, xylene, methylethylketone, methylisobutylketone, methylchloroform acetonitrile, tetrahydrofuran, dioxane, cyclohexanone, ethyl acetate, propyl acetate, isopropyl acetate, isobutyl acetate, butyl acetate, ethyl alcohol, ethyl alcohol, butanol, isopropanol, 2-methoxyethanol, acetone, and mixtures thereof.

15. A process according to claim 11 wherein the photochromic coating composition includes
    a photochromic dye; and
    a polymerisable carrier composition.

16. A process according to claim 15 wherein the polymerisable carrier composition is the same as, or similar to, the cross-linkable polymeric casting composition.

17. A process according to claim 11 wherein the coated gelled polymer is subjected to a final ultraviolet or thermal cure.

18. A process for preparing an ophthalmic lens which process includes providing
    a photochromic coating composition;
    a cross-linkable polymeric casting composition; and
    a suitable mould;
    coating a portion of the mould with the photochromic coating composition;
    adding the cross-inkable polymeric casting composition to the coated mould;
    subjecting the cross-linkable polymeric casting composition to a partial cure such that the polymer reaches or exceeds its point of gelation and maintaining contact between the partially cured gelled polymer and the photochromic coating composition for a period sufficient for dye or pigment transfer from the coating composition to the gelled polymer by permeation; and
    curing the partially cured cross-linkable polymer casting composition.

19. A process according to claim 18 wherein the photochromic coating composition includes at least one photochromic dye selected from the group consisting of anthraquinones, phthalocyanines, sprio-oxazines, chromenes, pyrans, and fulgides.

20. A process according to claim 19 wherein the mould defines first and second mould surfaces and the photochromic coating composition is applied to one or both of said mould surfaces prior to the partial curing step.

21. A process according to claim 20 wherein the layer of photochromic coating composition is applied at uniform thickness by spin coating the mould surface.

22. A process according to claim 12 wherein the film forming polymer is selected from the group consisting of polymethylacrylate, polymethylmethacrylate, polymethylbutyl methacrylate and mixtures thereof.

23. A process according to claim 22 wherein the solvent is selected from the group consisting of toluene, benzene, xylene, methylethylketone, methylisobutylketone, methylchloroform acetonitrile, tetrahydrofuran, dioxane, cyclohexanone, ethyl acetate, propyl acetate, isopropyl acetate, isobutyl acetate, butyl acetate, methyl alcohol, ethyl alcohol, butanol, isopropanol, 2-methoxyethanol, acetone, and mixtures thereof.

* * * * *